(12) United States Patent
Bugel et al.

(10) Patent No.: US 12,337,560 B2
(45) Date of Patent: Jun. 24, 2025

(54) METHOD AND AN ASSEMBLY FOR REMOVING AN INTRAOCULAR LENS FROM AN INJECTION MOLDED MOLD HALF

(71) Applicant: AMO Groningen B.V., Groningen (NL)

(72) Inventors: Rob Bugel, Eindhoven (NL); Richard Henricus Christianus Eijmberts, Eindhoven (NL); Mitchell Gerardus Maas, Eindhoven (NL); Franciscus Henricus Cornelius Maria Bijnen, Eindhoven (NL); Martin Dinant Bijker, Eindhoven (NL)

(73) Assignee: AMO Groningen B.V., Groningen (NL)

( * ) Notice: Subject to any disclaimer, the term of this patent is extended or adjusted under 35 U.S.C. 154(b) by 0 days.

(21) Appl. No.: 18/063,641

(22) Filed: Dec. 8, 2022

(65) Prior Publication Data
US 2023/0191731 A1 Jun. 22, 2023

(30) Foreign Application Priority Data
Dec. 22, 2021 (NL) ..................................... 2030237

(51) Int. Cl.
*B29D 11/00* (2006.01)
*B29L 11/00* (2006.01)

(52) U.S. Cl.
CPC . *B29D 11/00192* (2013.01); *B29L 2011/0041* (2013.01)

(58) Field of Classification Search
CPC ........ B29D 11/00192; B29D 11/00221; B29D 11/00576; B29D 11/00423; B29D 11/00432; B29D 11/023; B29L 2011/0041
See application file for complete search history.

(56) References Cited

U.S. PATENT DOCUMENTS

| 5,589,024 | A | 12/1996 | Blake |
| 9,566,749 | B2 | 2/2017 | Van Dijk |
| 12,116,442 | B2 * | 10/2024 | Cheng .............. B29D 11/00134 |

(Continued)

FOREIGN PATENT DOCUMENTS

| EP | 2892710 B1 | 4/2019 |
| KR | 102090335 B1 | 3/2020 |

OTHER PUBLICATIONS

ISO 11979-2, "Part 2—Optical Properties and Test Methods", Ophthalmic Implants—Intraocular Lenses, Edition 3, 30 pages, 2024.

*Primary Examiner* — Emmanuel S Luk

(57) ABSTRACT

A method and assembly for removing an intraocular lens from an injection molded mold half. With the method and the assembly, first spill ring material is removed from the mold half. Subsequently, the mold/lens-assembly is subjected to an oscillating mechanical load without substantial deformation of at least a part of the mold half that is in direct contact with the lens body. The oscillating mechanical load has an oscillation frequency which is in a range that excites the mold/lens-assembly to break bonds between the intraocular lens and the mold half. After that, a static mechanical push force is exerted on the bottom side of the mold half to at least partly separate the intraocular lens from the mold half.

18 Claims, 21 Drawing Sheets

(56) References Cited

U.S. PATENT DOCUMENTS

| | | | |
|---|---|---|---|
| 2002/0082690 A1 | 6/2002 | Sarbadhikari | |
| 2007/0145616 A1* | 6/2007 | Vanderlaan | G02B 1/043 |
| | | | 264/2.6 |
| 2009/0076603 A1* | 3/2009 | Avery | B29D 11/00865 |
| | | | 623/6.43 |
| 2014/0103552 A1* | 4/2014 | Nakahashi | B29C 43/50 |
| | | | 264/1.36 |
| 2014/0191429 A1* | 7/2014 | Nakahashi | B29C 43/36 |
| | | | 425/165 |
| 2016/0176074 A1* | 6/2016 | Gibson | B29C 39/36 |
| | | | 425/436 R |
| 2017/0173902 A1* | 6/2017 | Liu | B29D 11/00519 |
| 2018/0104919 A1* | 4/2018 | Lu | B29D 11/00192 |
| 2018/0169981 A1* | 6/2018 | Liu | B29C 43/50 |
| 2019/0126515 A1* | 5/2019 | Shin | B29D 11/00221 |
| 2019/0366659 A1* | 12/2019 | Breitkopf | B29D 11/00038 |

* cited by examiner

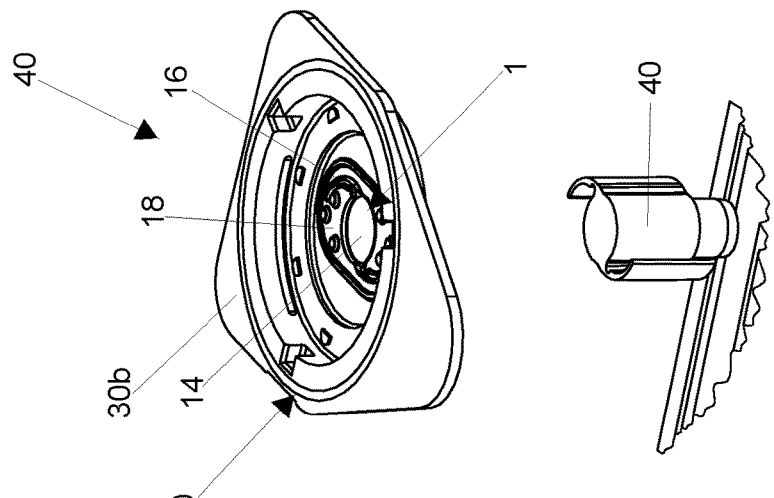
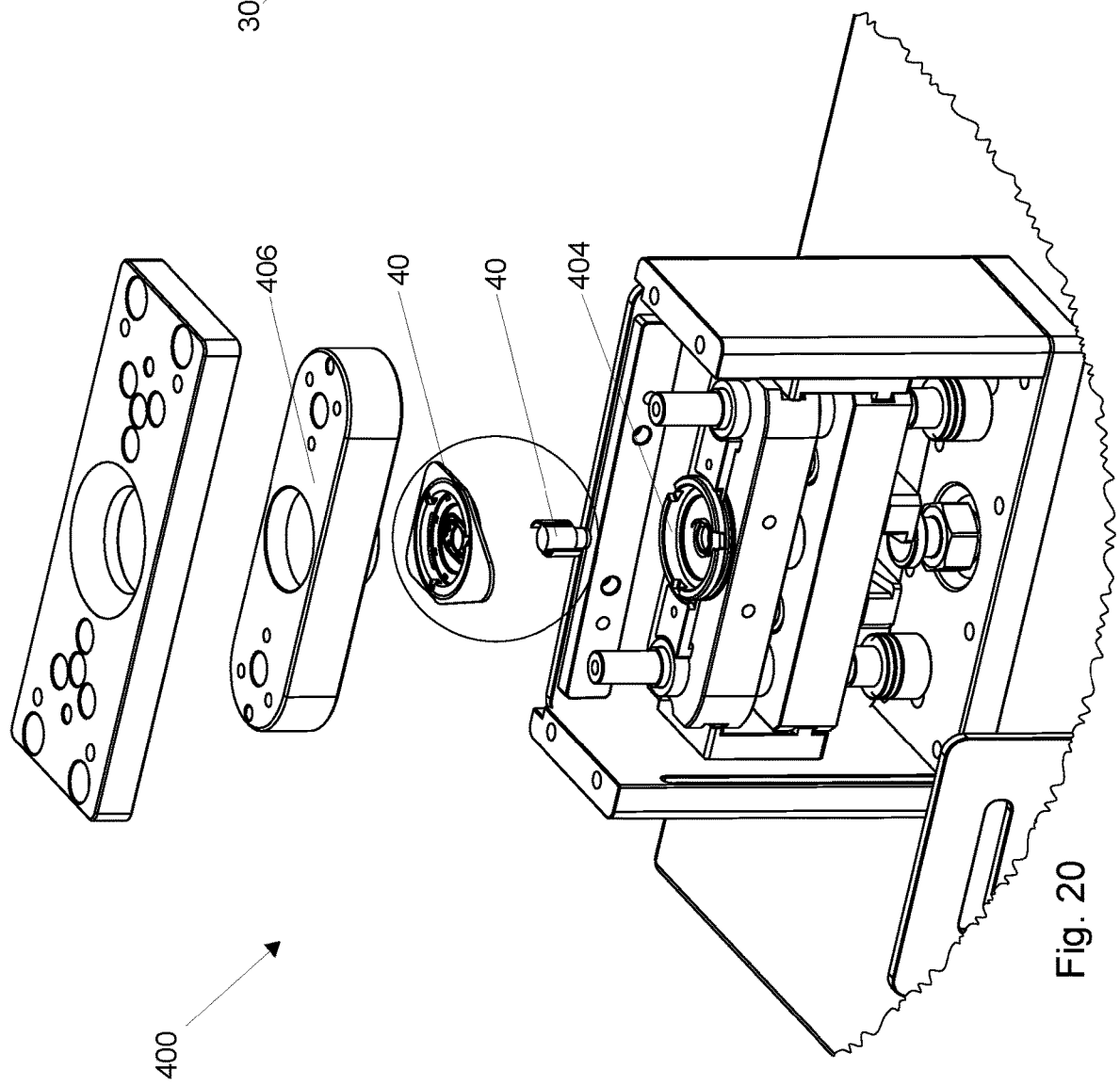
Fig. 21
Fig. 20

METHOD AND AN ASSEMBLY FOR REMOVING AN INTRAOCULAR LENS FROM AN INJECTION MOLDED MOLD HALF

CROSS REFERENCE TO RELATED APPLICATIONS

This application claims priority to Dutch patent application no. 2030237, filed on Dec. 22, 2021, the contents of which are incorporated by reference as if fully set forth.

FIELD

The disclosure relates to a method and an assembly for removing an intraocular lens from an injection molded mold half

BACKGROUND

EP 2 892 710 B1 discloses a method for manufacturing contact lenses or intraocular lenses in which two mold halves are injection molded and subsequently an amount of monomer is injected in the bottom mold half of the two mold halves. The top mold half is placed on top and the monomer is cured to form a lens.

KR102090335 B1 relates to a contact lens separation device comprising a pressure separation tool in the form of a vertical round bar with a pair of hemispherical pressing protrusions which protrude from a top surface of the bar. In the known method, the vertical pressing protrusions continuously contact the curved surface of the mold half while the pressure separation tool is rotated, thereby generating frictional heat in the mold half to soften the mold half and at the same time repeatedly pressurize the contact lens to vibrate. Thus, the contact lens is separated from the mold by introducing friction heat in the mold half and by exerting vibration at the same time by rotating pressure separation tool with the two pressing protrusions and at the same time pushing the pressure separation tool with the protrusion against the bottom of the mold half.

SUMMARY

During the manufacturing method disclosed in EP 2 892 710 B1, bonds are formed between the intraocular lens and the mold half in which the monomer for forming the intraocular lens is injected and cured. As a consequence of these bonds, separating the intraocular lens from the mold half is a challenge.

KR102090335 B1 does not relate to intraocular lenses but to contact lenses. A difference between intraocular lens and contact lens is that the intraocular lens not only comprises a lens body but additionally includes lens support members which are connected to the lens body. A purpose of the lens support members is to keep the intraocular lens in its position after it has been placed in the eye of the patient. Due to the differences in shape between a contact lens and an intraocular lens, different considerations must be taken into account when molding the lenses.

The device and method described in KR102090335 B1 are not optimal in view of damage which may be inflicted upon the contact lens during the separating procedure. Indeed, the frictional heat and the deformation of the mold half as a consequence of the relative movement of the pressing protrusions against the mold half could cause deterioration of optical quality of the contact lens.

An object of the present disclosure is to provide a solution for separating an intraocular lens from a mold half.

To that end, the disclosure provides in a first aspect a method for removing an intraocular lens from an injection molded mold half, the intraocular lens having a lens body and lens support members connected to the lens body, the method comprising:

providing a mold half having a bottom side and an opposite top side in which an intraocular lens assembly is contained and attached by bonds between material from which mold half is formed and a cured monomer lens material from which the intraocular lens assembly is formed, the intraocular lens assembly comprising the intraocular lens with the lens body and the lens support members as well as spill ring material;

wherein for separating the intraocular lens from the mold half the method subsequently comprises:

holding the mold half and mechanically engaging the spill ring material to remove the spill ring material from the mold half to provide a mold/lens-assembly consisting of the mold half and the intraocular lens;

subjecting the mold/lens-assembly to an oscillating mechanical load without substantial deformation of at least a part of the mold half that is in direct contact with the lens body, the oscillating mechanical load having an oscillation frequency which is in a range that excites the mold/lens-assembly to break the bonds between the intraocular lens and the mold half; and exerting a static mechanical push force on the bottom side of the mold half to at least partly separate the intraocular lens from the mold half.

In a second aspect, the disclosure provides an assembly for removing an intraocular lens from an injection molded mold half, the intraocular lens having a lens body and lens support members connected to the lens body, the assembly comprising:

a handler assembly configured to handle a mold half having a bottom side and an opposite top side in which an intraocular lens assembly is contained and attached by bonds between material from which mold half is formed and a cured monomer lens material from which the intraocular lens assembly is formed, the intraocular lens assembly comprising the intraocular lens with the lens body and the lens support members as well as spill ring material;

a spill ring removal station including a spill ring engagement device that is configured for mechanically engaging the spill ring material, to remove the spill ring material from the mold half to provide a mold/lens-assembly consisting of the mold half and the intraocular lens;

a bond breaking station configured to subject the mold/lens-assembly to an oscillating mechanical load without substantial deformation of at least a part of the mold half that is in direct contact with the lens body, the oscillating mechanical load having an oscillation frequency which is in a range that excites the mold/lens-assembly to break the bonds between the intraocular lens and the mold half;

a push station including a die which is configured to exert a static mechanical push force on the bottom side of the mold half to at least partly separate the intraocular lens from the mold half; and an electronic controller assembly which is configured to control the operation of the handler assembly such that each mold half with an intraocular lens assembly contained therein is first transported by the handler assembly to a spill ring removal position in the spill ring removal station;

that subsequently, after removal of the spill ring material the handler assembly transports the mold/lens assembly from the spill ring removal station to a bond breaking position in the bond breaking station; and that subsequently, after breaking the bonds in the bond breaking station the handler assembly transports the mold/lens-assembly to the push station;

wherein the electronic controller assembly is also configured to:

control the spill ring engagement device of the spill ring removal station;

control the bond breaking station to subject the mold/lens-assembly to the oscillating mechanical load; and to control the push station by operating the die to at least partly separate the intraocular lens from the mold half by exerting a static mechanical push force on the bottom side of the mold half.

Surprisingly, it has been found that the three subsequent stages of the method disclosed herein, that is:

1. mechanically engaging the spill ring material to remove the spill ring material from the mold half;

2. subjecting the mold/lens-assembly to an oscillating mechanical load without substantial deformation of at least a part of the mold half that is in direct contact with the lens body, the oscillating mechanical load having an oscillation frequency which is in a range that excites the mold/lens-assembly to break the bonds between the intraocular lens and the mold half; and 3. exerting a static mechanical push force on the bottom side of the mold half to at least partly separate the intraocular lens from the mold half;

provides a method of separation in which the optical quality of the intraocular lens remains above a quality threshold. One way to express the quality of a lens is the modulation transfer function (hereafter MTF) which is known to the skilled person and which is a measurement of the ability of a lens ability to transfer contrast at a particular resolution from the object to the image. In other words, MTF is a way to incorporate resolution and contrast into a single specification. MTF is defined in ISO11979-2. With the intraocular lenses which have been separated from the mold half with the method and the device according to the disclosure, an MTF at 50 c/mm in a Cornea Eye model measured at a diameter of 3 mm of at least 0.54 is achieved. This is higher than the MTF's which have been achieved with prior art separation methods.

Further embodiments of the disclosure are described in the dependent claims and will be further elucidated in the detailed description in which reference will be made to the drawings in which some examples of the device of the present disclosure are shown.

BRIEF DESCRIPTION OF THE DRAWINGS

FIG. 20 shows detail XX from FIG. 19;

FIG. 21 shows detail XXI from FIG. 20;

DETAILED DESCRIPTION

In this application similar or corresponding features are denoted by similar or corresponding reference signs. The description of the various embodiments is not limited to the examples shown in the figures and the reference numbers used in the detailed description and the claims are not intended to limit the description of the embodiments, but are included to elucidate the embodiments.

Figure 1:
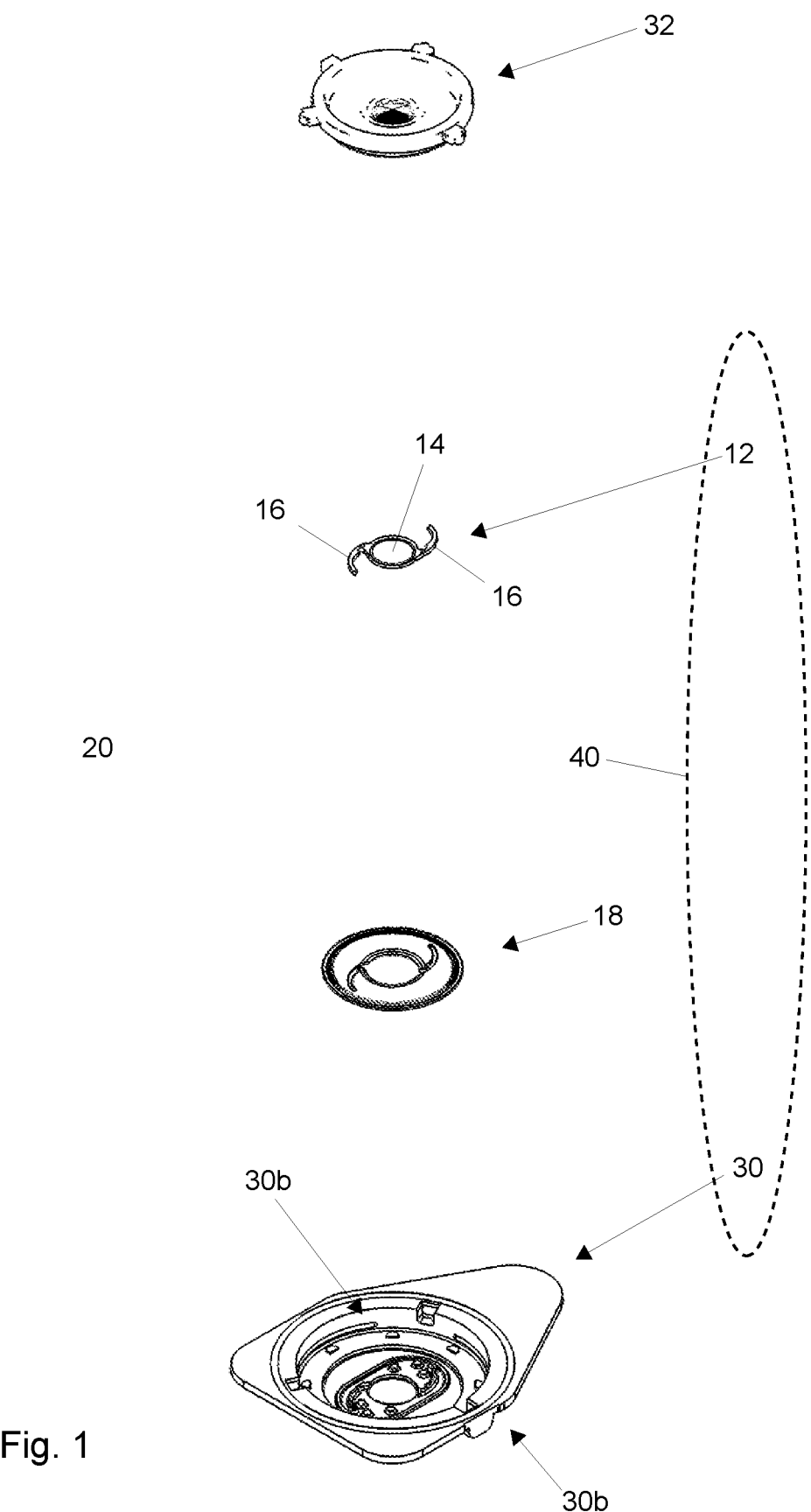
FIG. 1 shows an exploded perspective view of the mold half, the second mold half, the intraocular lens assembly and the spill ring material.

FIG. 1 shows an exploded view of a mold half 30, a second mold half 32, an intraocular lens 12 having a lens body 14 and lens support member 16 which are connected to the lens body 14. Also shown is spill ring material 18 which is present between the mold half 30 and the second mold half 32 after the monomer has cured from which the intraocular lens 12 is formed.

First the assembly 10 for removing an intraocular lens 12 from a mold half 30 will be described. Subsequently, the method for that purpose will be described.

Figure 2:
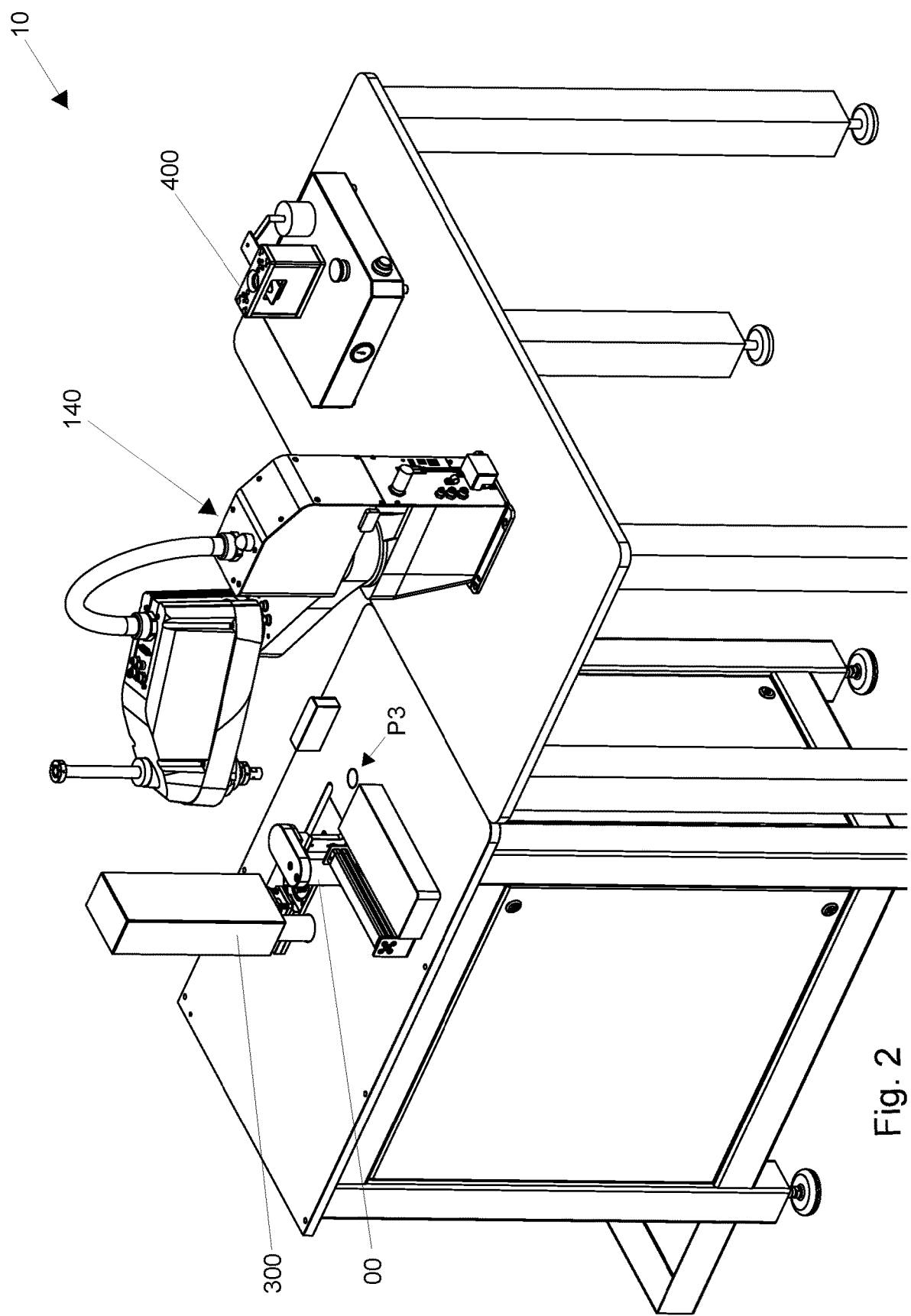
FIG. 2 shows a perspective view of an example of the assembly for removing an intraocular lens from an injection molded mold half.
Figure 3:
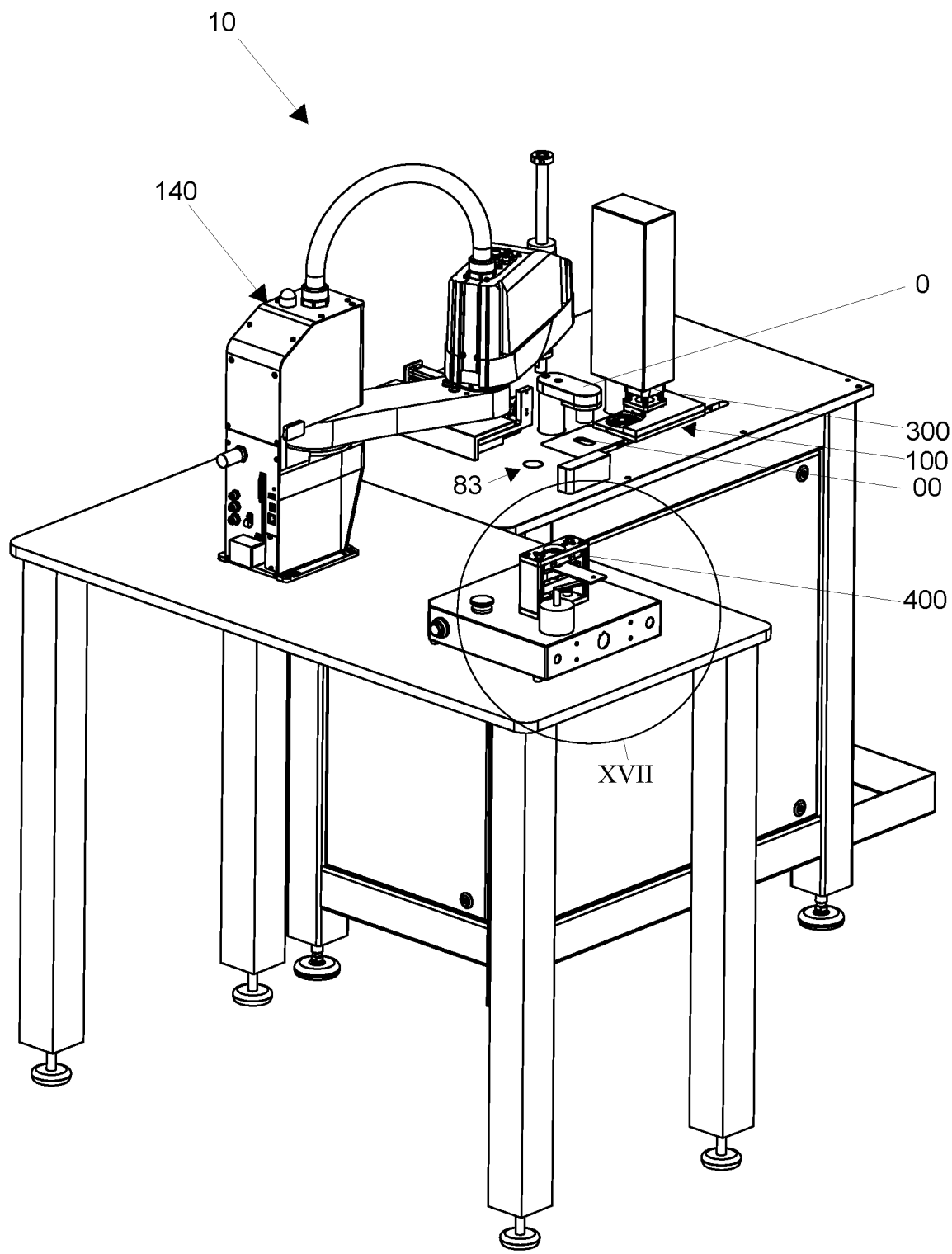
FIG. 3 shows another perspective view from another view point from the assembly shown in FIG. 2.
Figure 4:
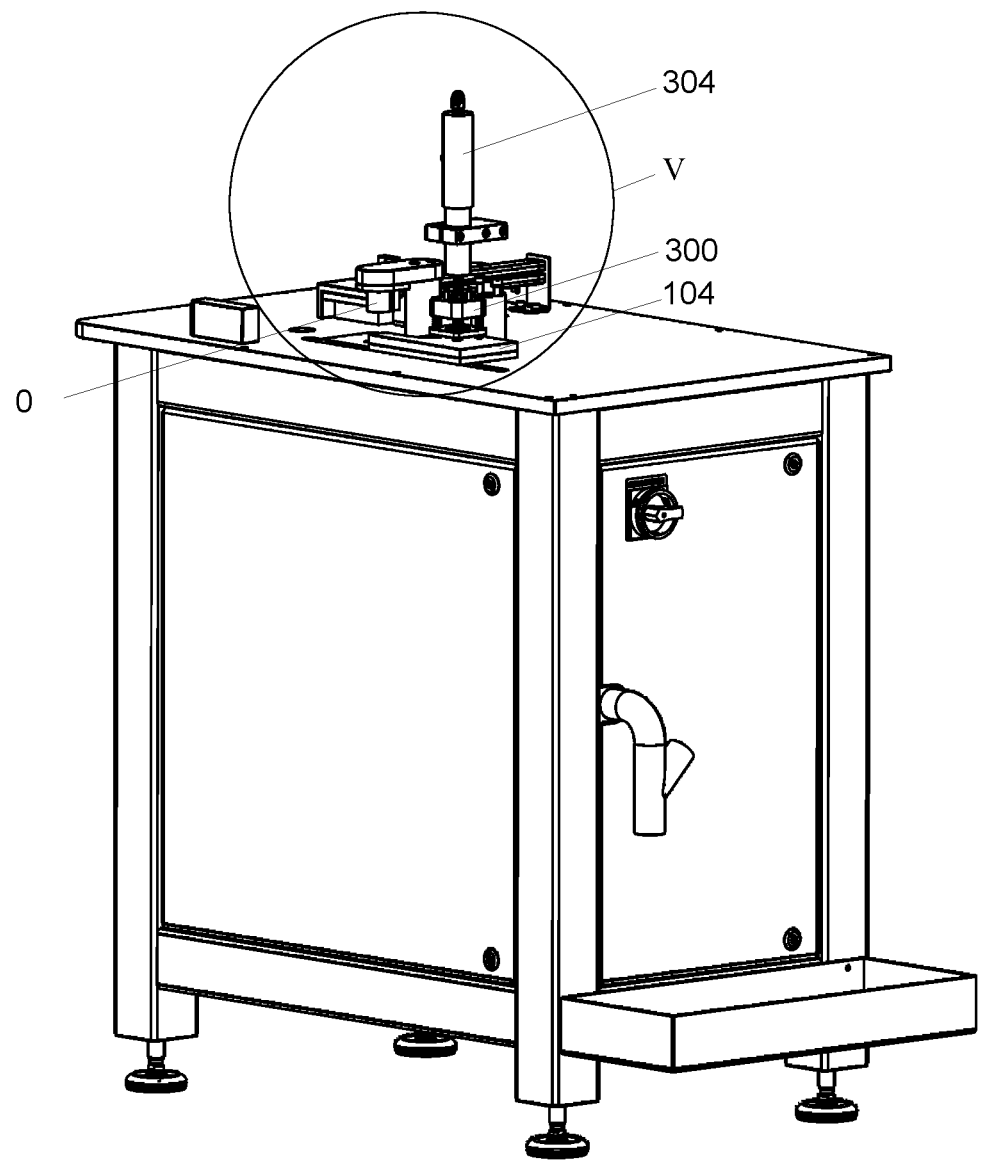
FIG. 4 shows a first perspective view of the spill ring removal station and the bond breaking station.
Figure 5:
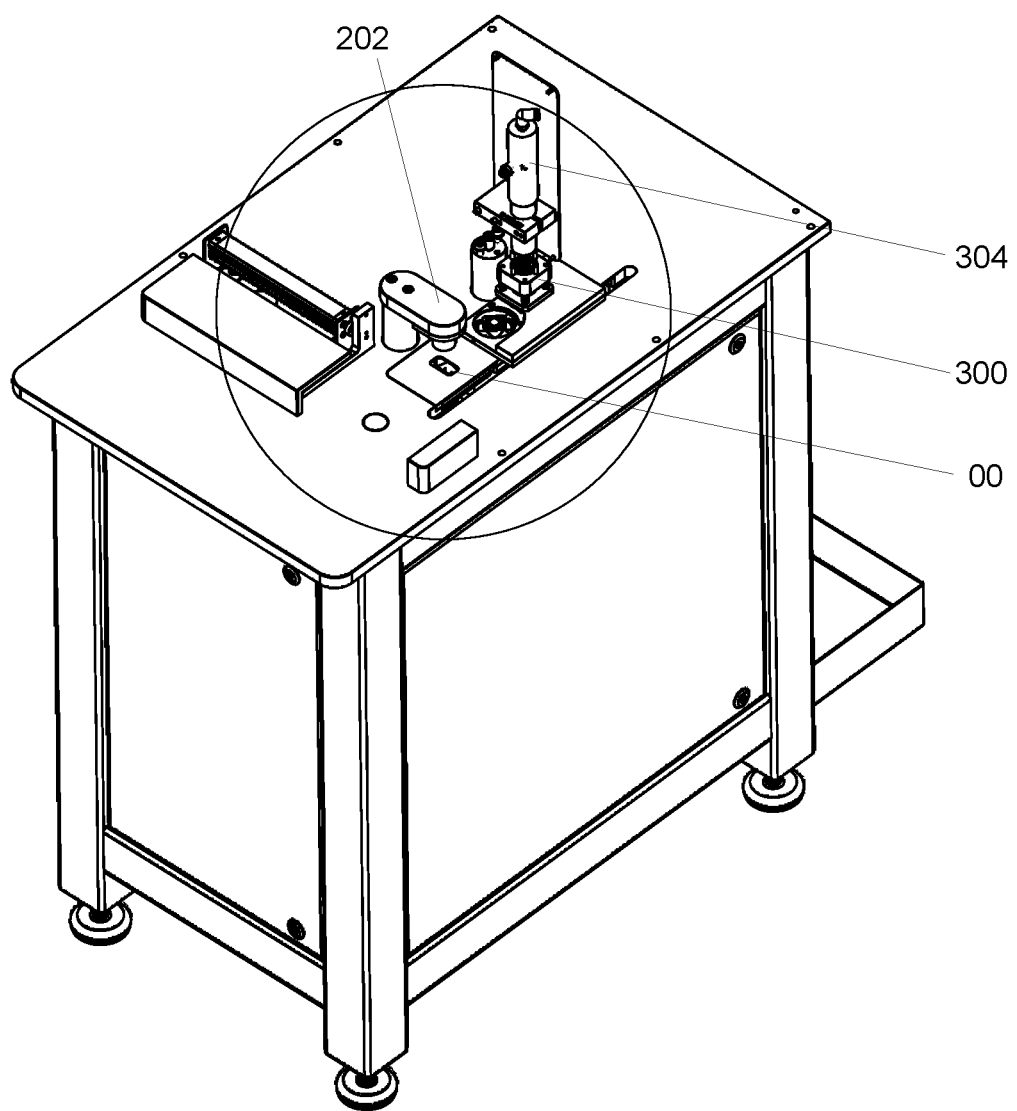
FIG. 5 shows a second perspective view of the spill ring removal station and the bond breaking station.
Figure 6:
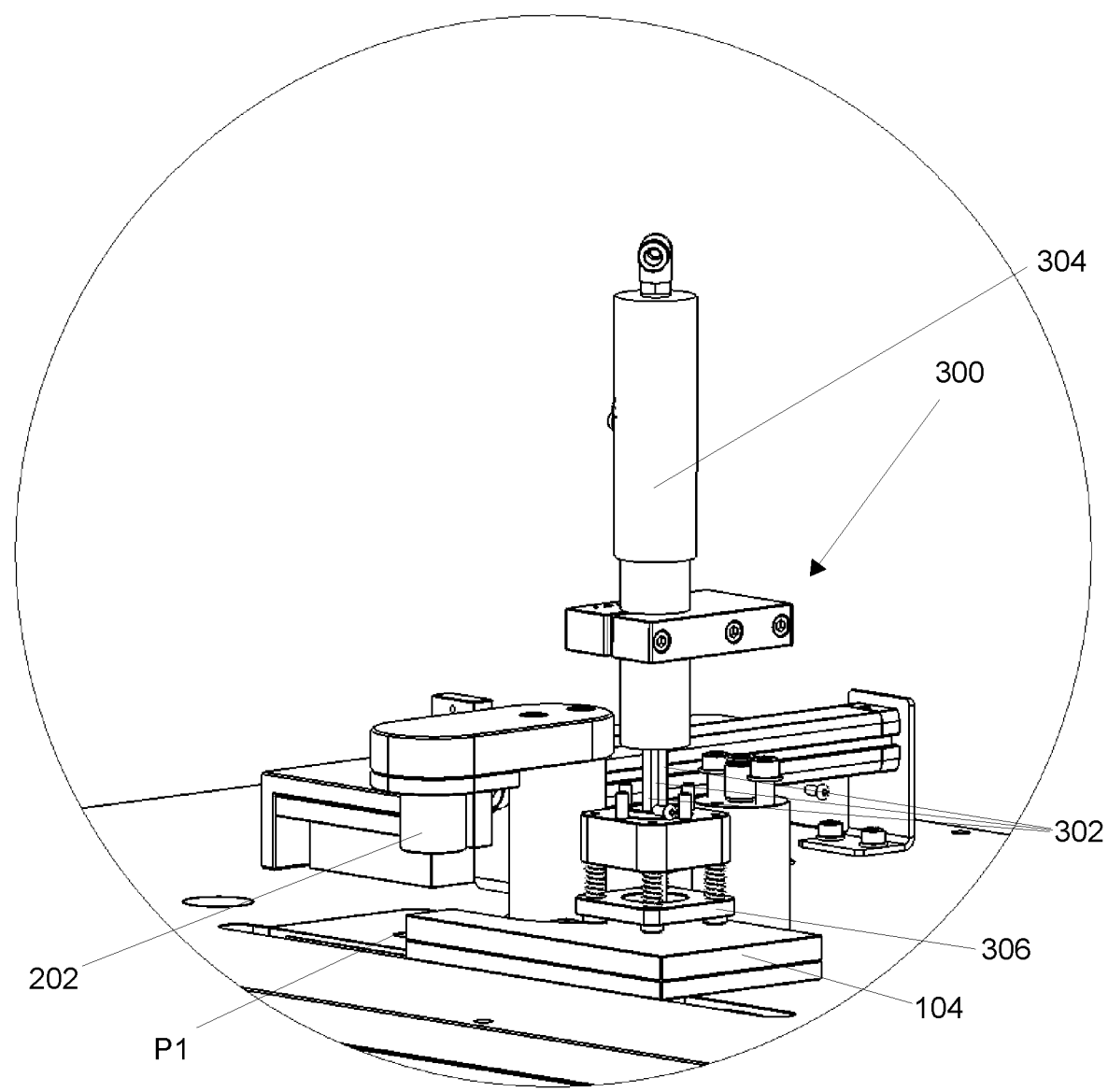
FIG. 6 shows detail VI from FIG. 4.
Figure 7:
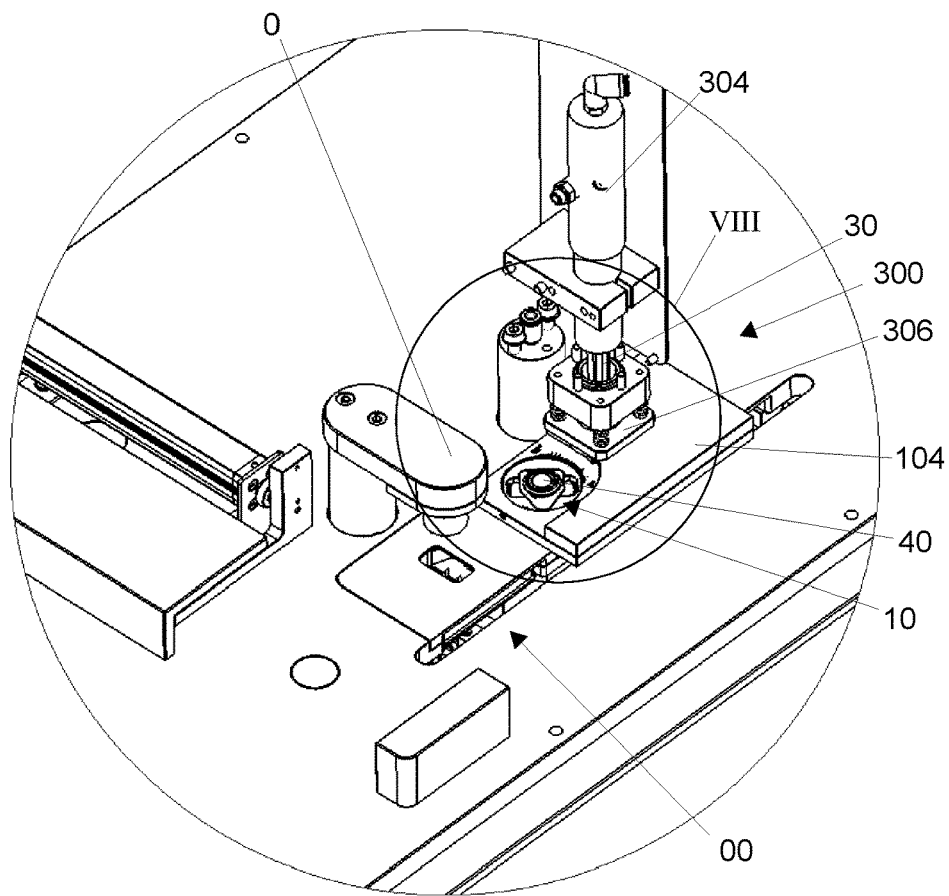
FIG. 7 shows detail VII from FIG. 5.
Figure 8:
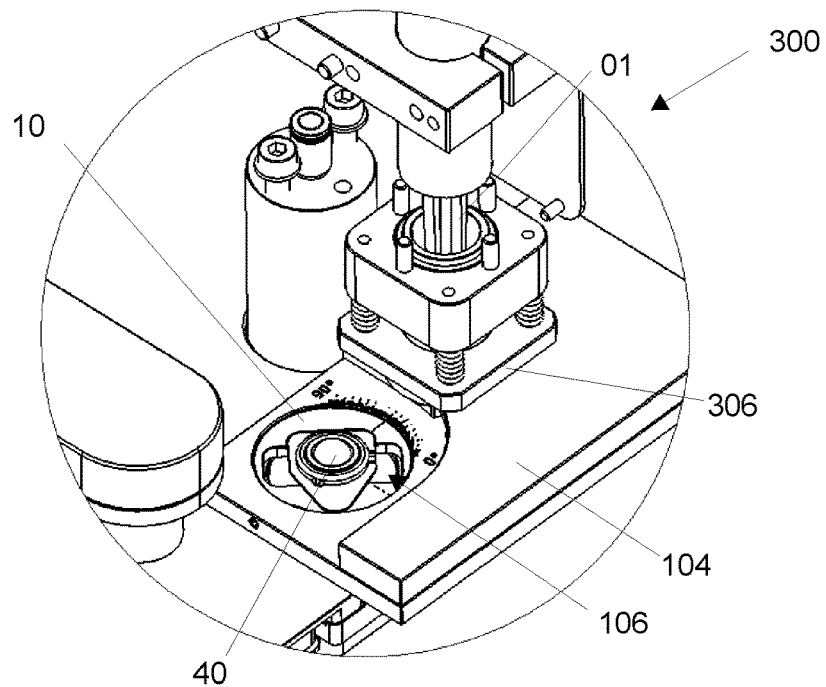
FIG. 8 shows detail VIII from FIG. 7.
Figure 9:
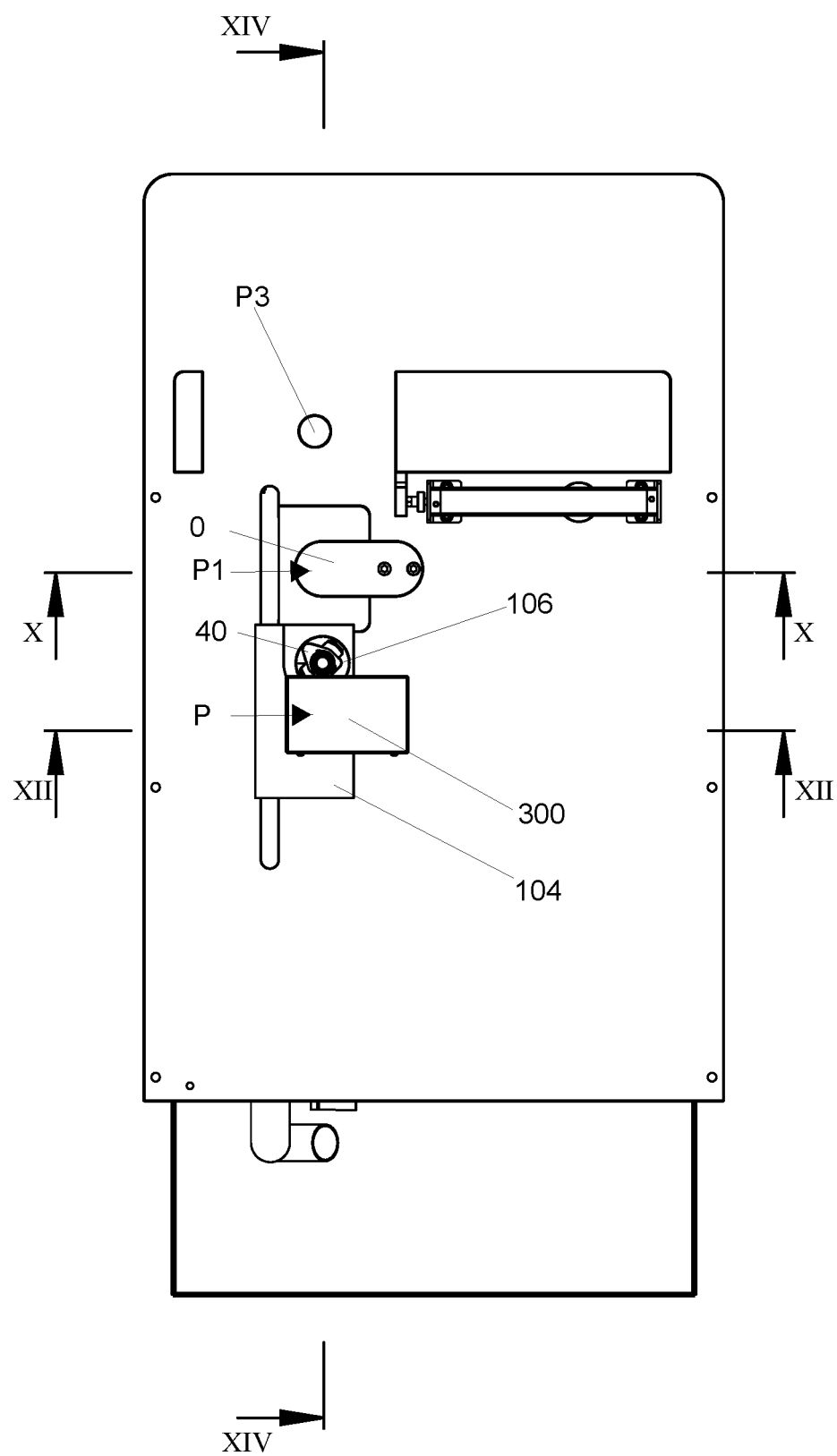
FIG. 9 shows a top view of the spill ring removal station and the bond breaking station shown in FIGS. 4 and 5.
Figure 10:
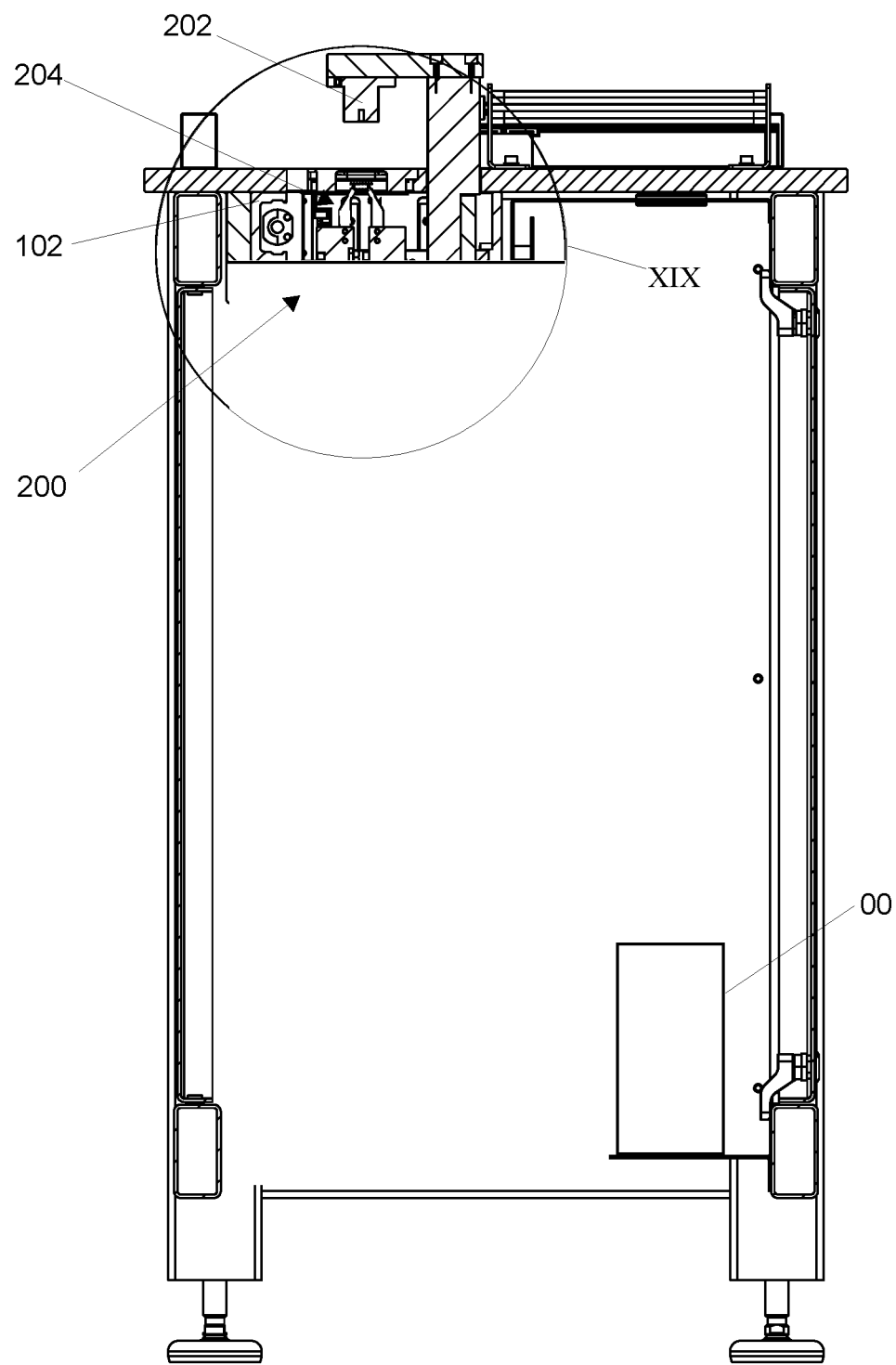
FIG. 10 shows a cross sectional view over line X-X in FIG. 9.
Figure 11:
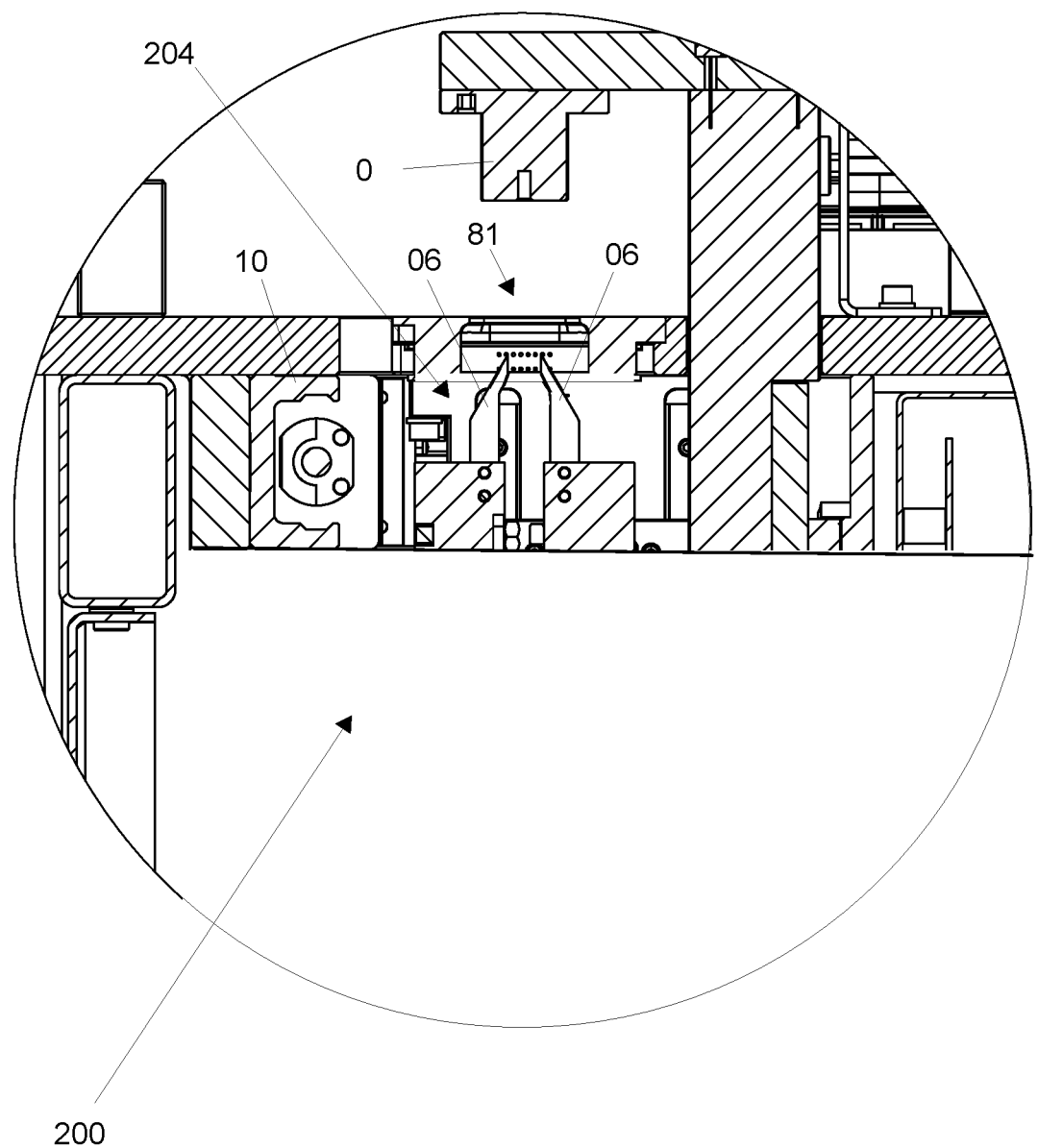
FIG. 11 shows detail XI from FIG. 10.
Figure 13:
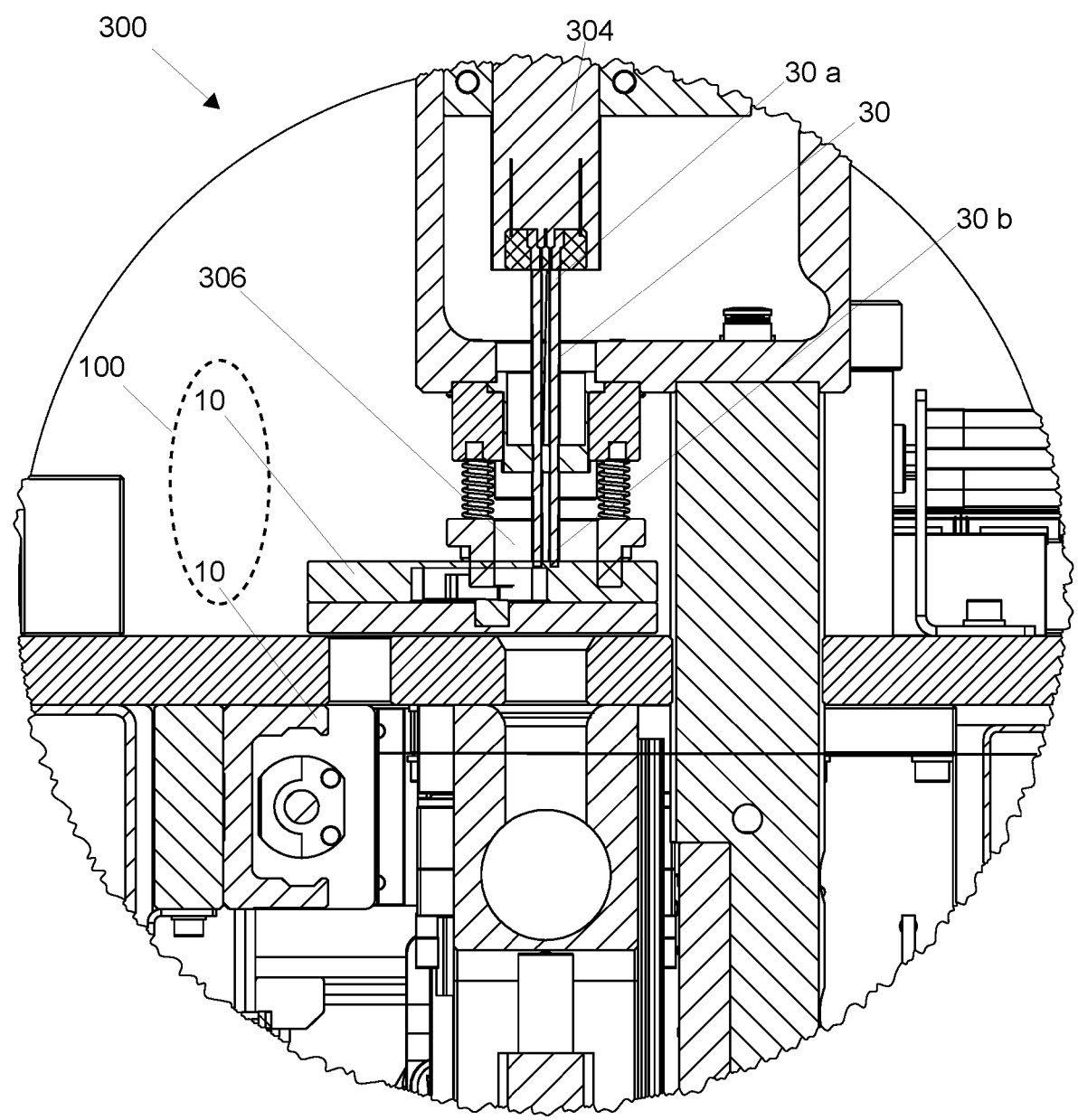
FIG. 13 shows detail XIII from FIG. 12.
Figure 14:
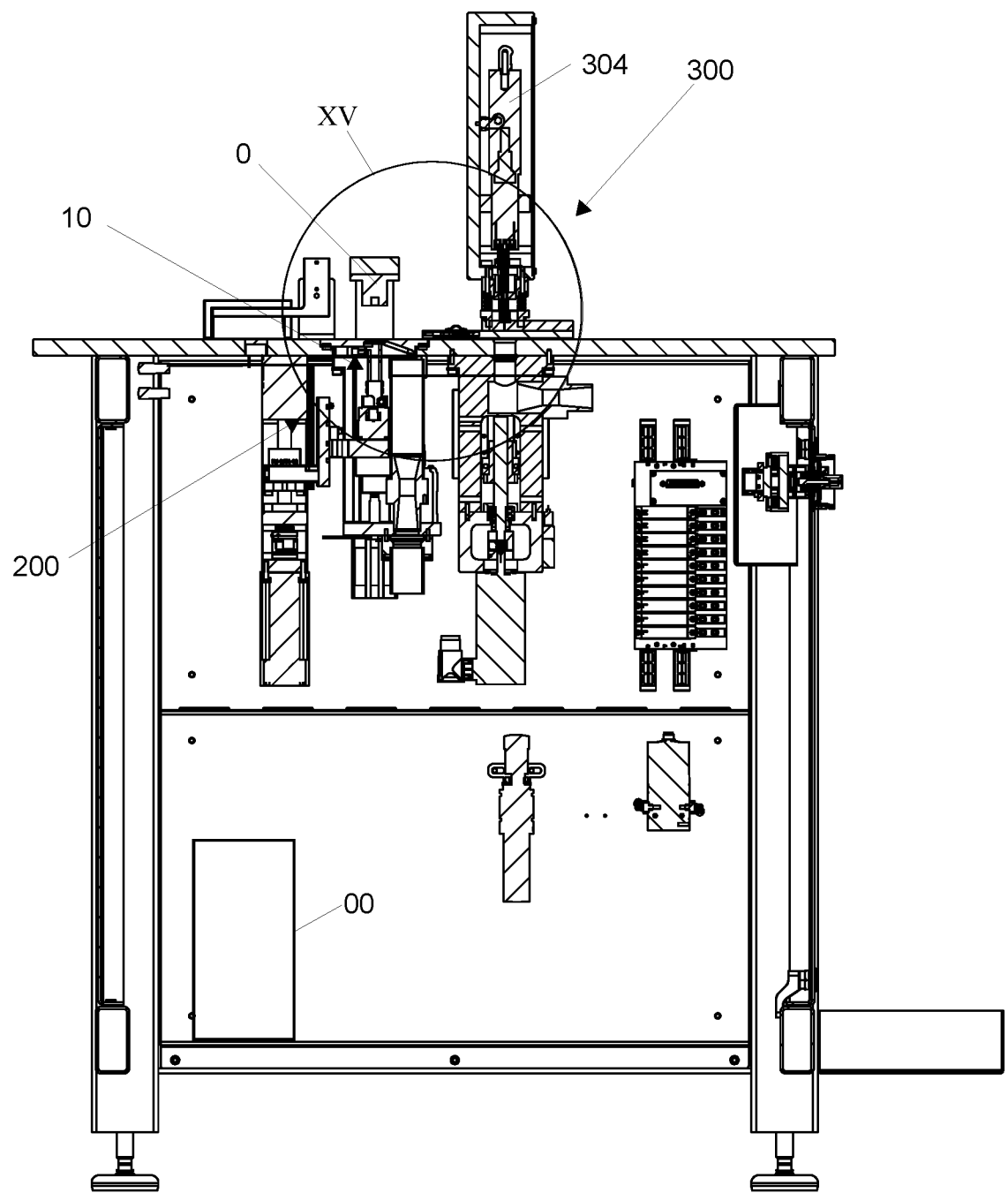
FIG. 14 shows a cross sectional view over line XIV-XIV in FIG. 9.
Figure 15:
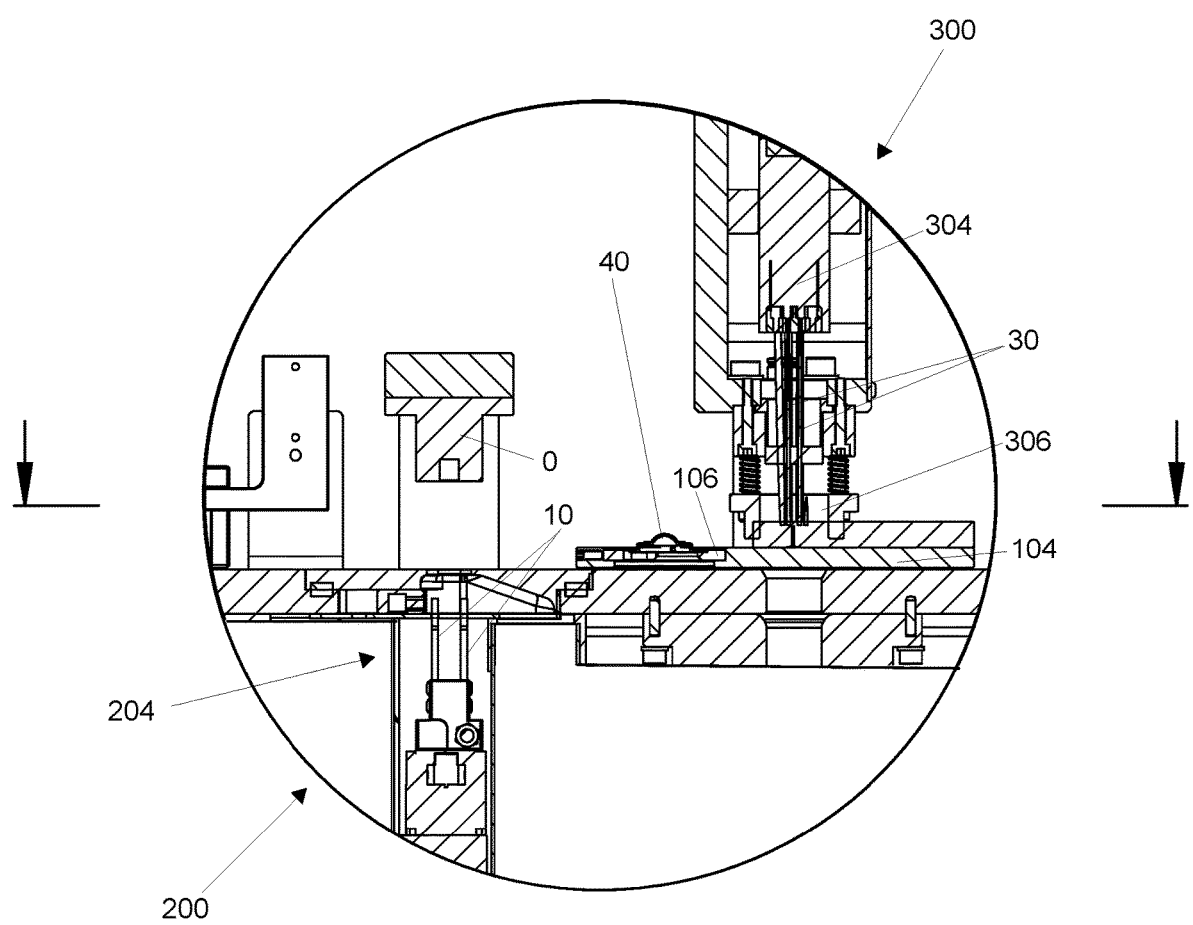
FIG. 15 shows detail XV in FIG. 14.

In most general terms, the disclosure provides an assembly for removing an intraocular lens 12 from an injection molded mold half 30. An example of such an assembly 10 is shown in FIGS. 2 and 3. The assembly 10 comprises a handler assembly 100, 140 (see FIGS. 3 and 13) configured to handle a mold half 30. The handler assembly 100, 140 has two reference numbers in combination because in the shown example the handler assembly 100, 140 comprises a carrier/guide-assembly 100 and a robot 140. The handler assembly may be embodied in other manners, e.g. by a single robot, a more extensive carrier/guide-assembly or other types of handlers. The mold half 30 has a bottom side 30a and an opposite top side 30b in which an intraocular lens assembly 20 is contained and attached by bonds between material from which mold half 30 is formed and a cured monomer lens material from which the intraocular lens assembly 20 is formed. The intraocular lens assembly 20 comprises the intraocular lens 12 with the lens body 14 and the lens support members 16 as well as spill ring material 18. The assembly 10 for removing an intraocular lens 12 also comprises a spill ring removal station 200 of which an example is clearly visible in FIGS. 7, 10 and 11. The spill ring removal station 200 may, in an embodiment, include a mold half holding device 202 that is configured for holding the mold half stationary. In the example shown in the figures, mold half holding device 202 is upwardly and downwardly moveable and pushes the mold half 30 with the intraocular lens assembly 20 contained therein downwardly during removal of the spill ring material 18. In any case, the spill ring removal station 200 includes a spill ring engagement device 204 (see FIGS. 10, 11, 14-16) that is configured for mechanically engaging the spill ring material 18 to remove the spill ring material 18 from the mold half 30 to provide a mold/lens-assembly 40 consisting of the mold half 30 and the intraocular lens 12.

Figure 16:
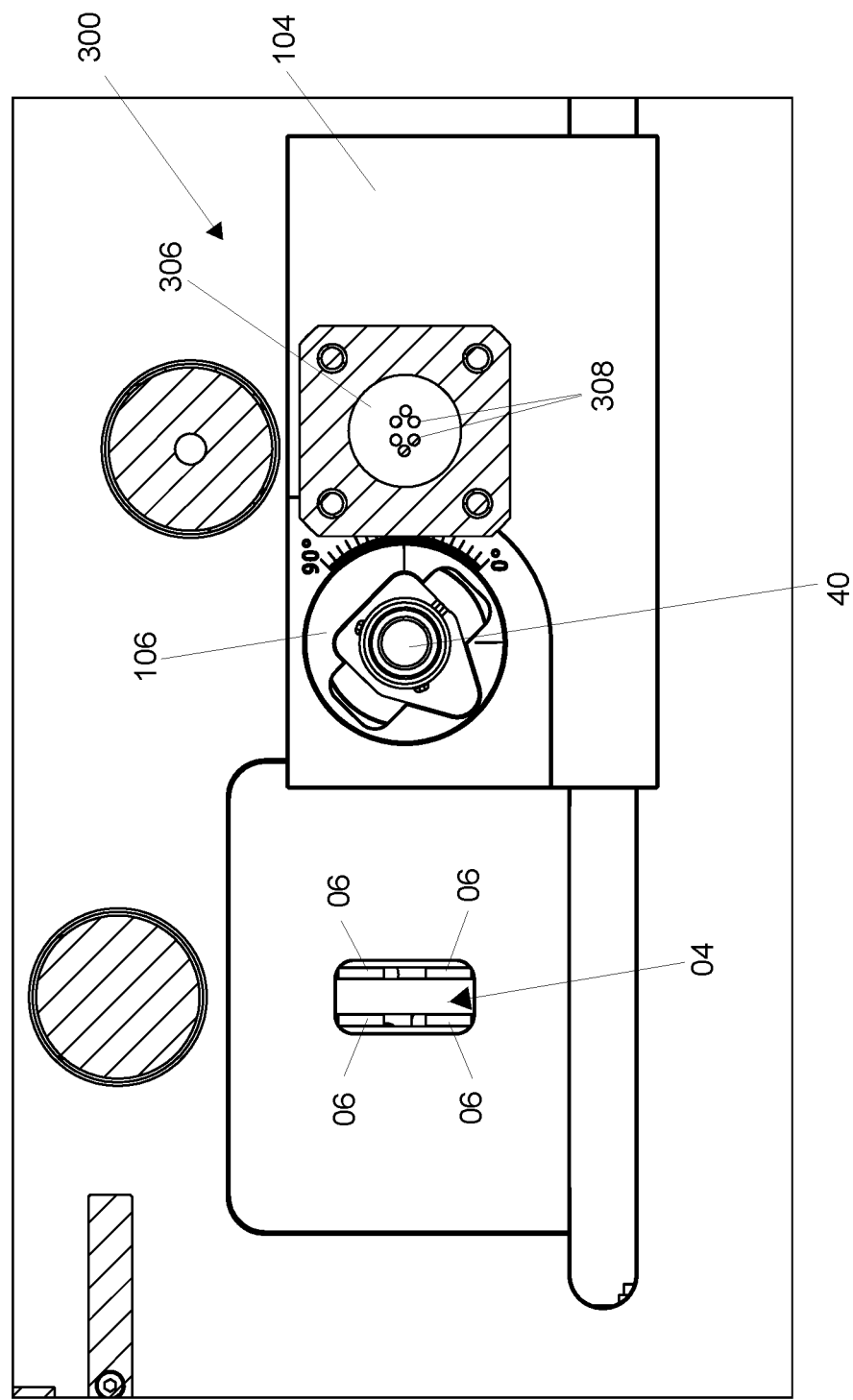
FIG. 16 shows a cross sectional view over line XVI-XVI in FIG. 15.
Figure 17:
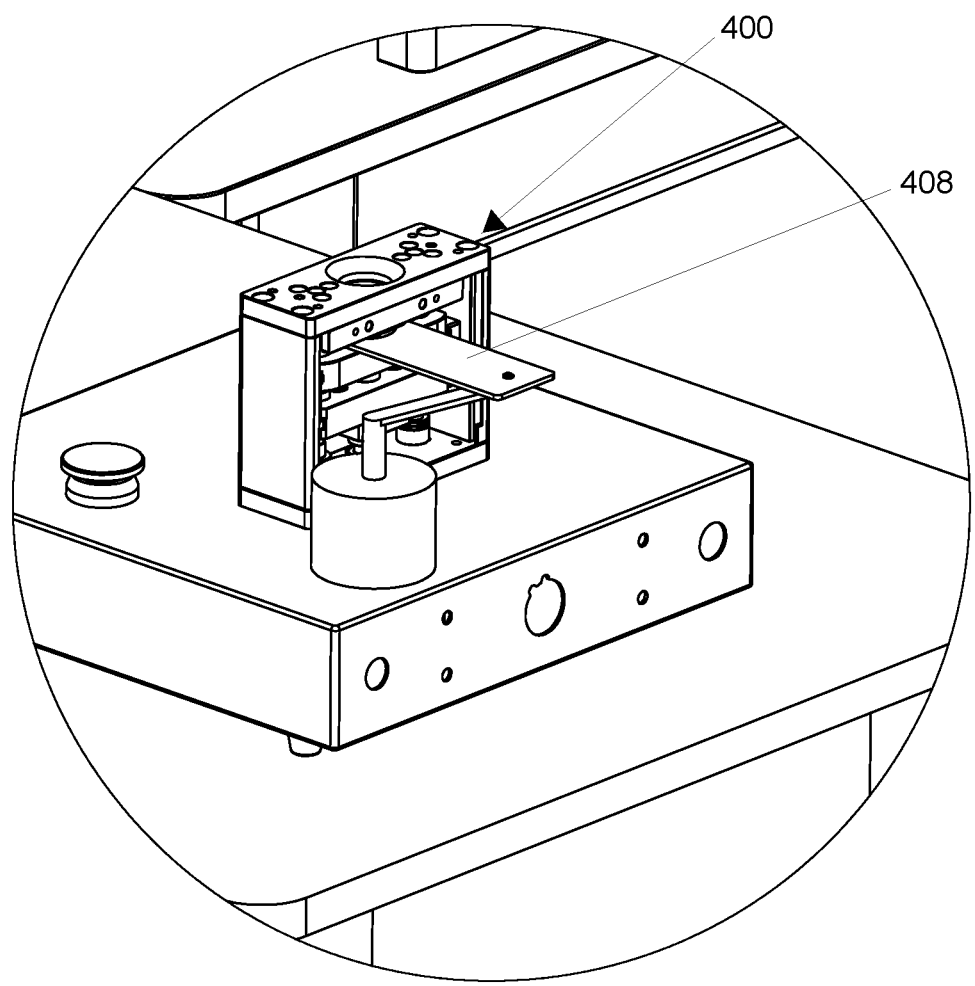
FIG. 17 shows a first perspective view of the push station shown in the example of FIGS. 1 and 2.
Figure 18:
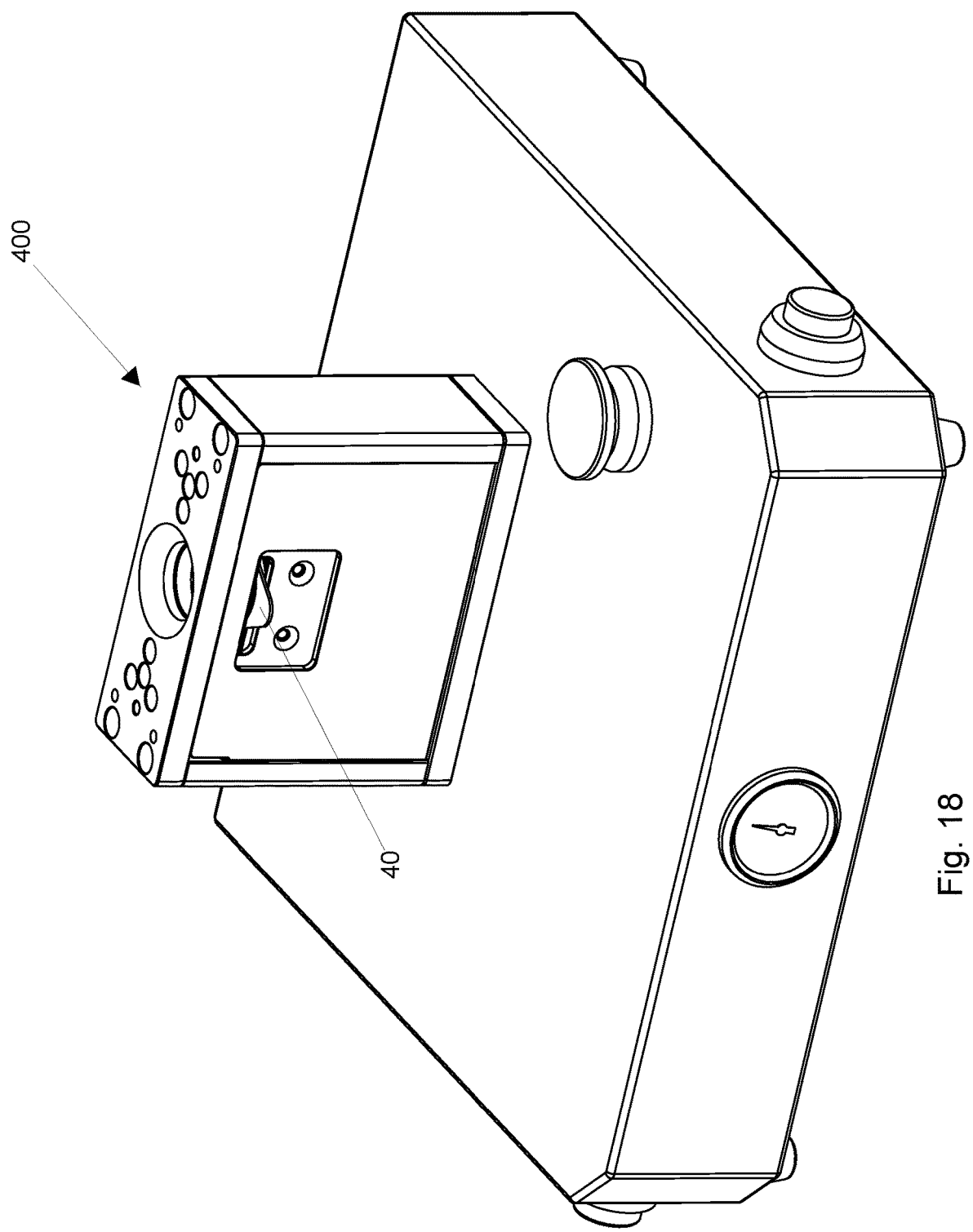
FIG. 18 shows a second perspective view of the push station shown in FIG. 17 without the slide.
Figure 19:
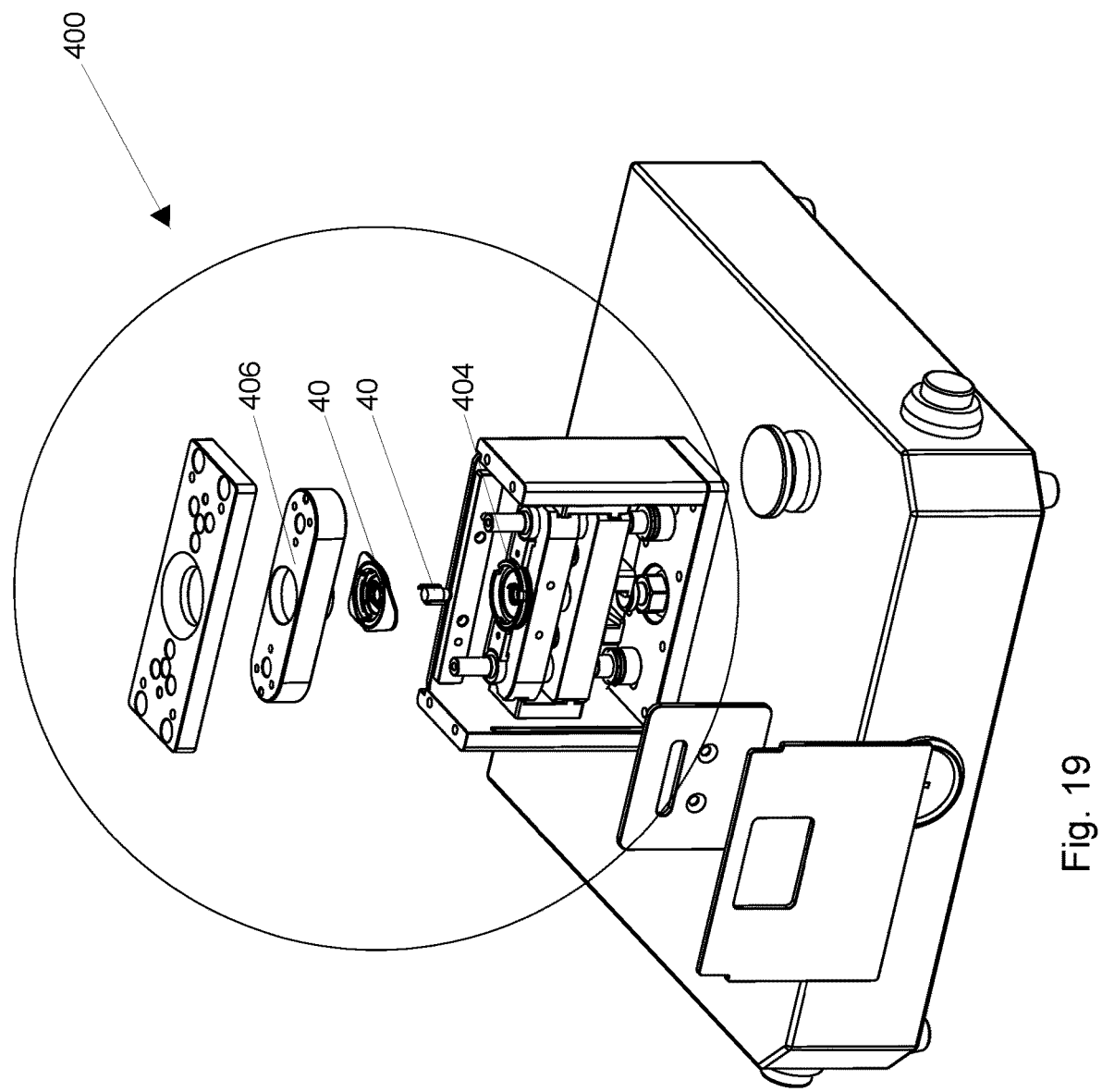
FIG. 19 shows an exploded view of the perspective view of FIG. 18.

The assembly 10 for removing an intraocular lens 12 further comprises a bond breaking station 300 of which an example is visible in FIGS. 2, 3, 4, 5, 6, 7, partly in 8, 9, 12, 13, 14, 15 and in cross section in FIG. 16. The bond breaking station 300 is configured to subject the mold/lens-assembly 40 to an oscillating mechanical load without substantial deformation of at least a part of the mold half 30 (see FIG. 1) that is in direct contact with the lens body 14 (see FIG. 1). The oscillating mechanical load may have an oscillation frequency which is in a range that excites the mold/lens-assembly 40 to break the bonds between the intraocular lens 12 and the mold half 30.

Figure 12:
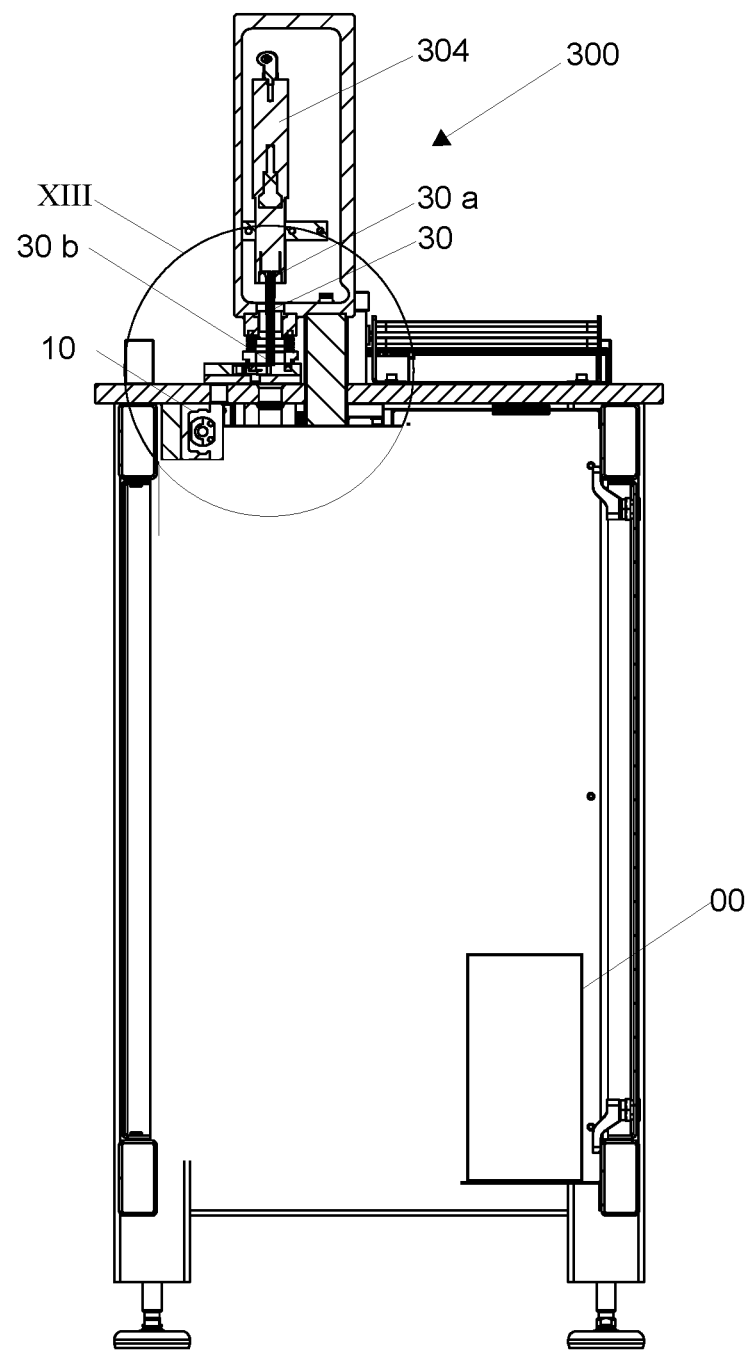
FIG. 12 shows a cross sectional view over line XII-XII in FIG. 9.

The assembly 10 for removing an intraocular lens 12 additionally comprises a push station 400 of which an example is clearly visible in FIGS. 2, 3 and 17-20. The push station 400 includes a die 402 which is configured to exert a static mechanical push force on the bottom side 30a of the mold half 30 to at least partly separate the intraocular lens 12 from the mold half 30; and Finally, the assembly 10 for removing an intraocular lens 12 comprises an electronic controller assembly 11 which is visible in FIGS. 10, 12 and 14. The electronic controller assembly 11 may comprise a single electronic controller or a distributed set of controllers. In any case, the electronic controller assembly 11 is configured to control the operation of the handler assembly 100, 140 such that each mold half 30 with an intraocular lens assembly 20 contained therein is first transported by the handler assembly 100, 140 to a spill ring removal position P1 in the spill ring removal station 200.

Figure 23:
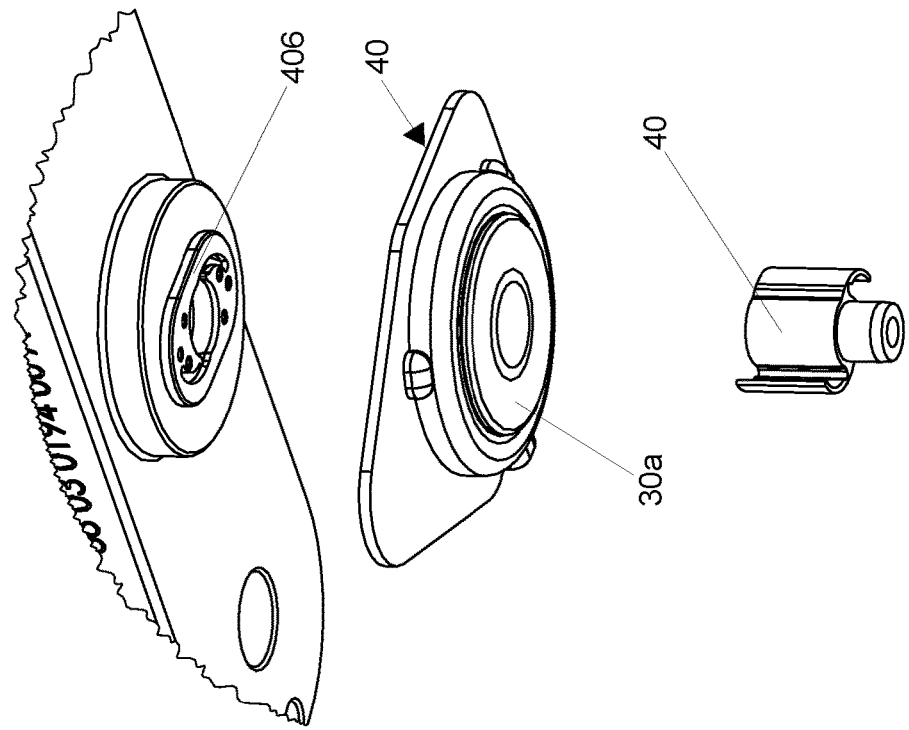
FIG. 23 shows detail XXIII from FIG. 22

When the mold half 30 is positioned in spill ring removal position P1, it may be in an inverted position, that is with the bottom side 30a (see FIGS. 1 and 21) turned upwardly and with the top side 30b (see FIGS. 1 and 23) turned downwardly. However, the assembly for removing an intraocular lens 12 is not limited to such a configuration.

The electronic controller assembly 11 (see FIGS. 10, 12, 14) is also configured to subsequently, after removal of the spill ring material 18 control the handler assembly 100, 140 to transport the mold/lens assembly 40 from the spill ring removal station 200 to a bond breaking position P2 in the bond breaking station 300. In the example shown in the figures, the mold/lens-assembly 40 is then still in the inverted position with the bottom side turned upwardly.

The electronic controller 11 is also configured to, subsequently, i.e. after breaking the bonds in the bond breaking station 300, control the handler assembly 100, 140 to transport the mold/lens-assembly 40 to the push station 400.

When being placed in a mold/lens-assembly carrier 404 of the push station 400, that is, the mold/lens-assembly 40 may be in the normal position with the top side 30b (see FIGS. 1 and 21) directed upwardly and the bottom side 30a (see FIGS. 1 and 23) directed downwardly.

In addition, the electronic controller assembly 11 is configured to:

control the spill ring engagement device 204 of the spill ring removal station 200 and the optional mold half holding device 202;

control the bond breaking station 300 to subject the mold/lens-assembly 40 to the oscillating mechanical load; and to control the push station 400 by operating the die 402 to at least partly separate the intraocular lens 12 from the mold half 30 by exerting a static mechanical push force on the bottom side 30a of the mold half 30.

With the assembly 10 for removing an intraocular lens 12 as described above, the method of the present disclosure can be automatically performed. Thus, a high production capacity of separated intraocular lenses 12 may be obtained. The advantages which have been described in the summary are considered here to be included by reference.

In an embodiment, the handler assembly 100, 140 may comprise a carrier/guide-assembly 100 comprising a linear guide 102 and a carrier 104 which is movable over the linear guide 102. The carrier 104 is clearly visible in FIGS. 6-9 and the guide 102 is clearly visible in FIGS. 10-13. The carrier 104 has a mold half receiving recess 106 in which the mold half 30 is placeable. The carrier/guide-assembly 100 may be configured to be positioned in at least three positions including:

a loading/unloading position P3 in which the mold half receiving recess 106 is accessible for loading/unloading a mold half 30 with an intraocular lens assembly 20 contained therein;

the spill ring removal position P1 in which the mold half receiving recess 106 is positioned in the spill ring removal station 200;

the bond breaking position P2 in which the mold half receiving recess 106 is positioned in the bond breaking station 300.

Such a carrier/guide-assembly 100 is robust and stable and at the same time relatively low priced. Movement of the carrier 102 over the guide 104 may be very quick so that a high production can be achieved.

In an embodiment, the carrier/guide-assembly 100 may be configured to positioned in at least four positions. Thereby, the unloading position may be at a different location as the loading position.

In an embodiment, the mold half receiving recess 106 may formed in a rotatable table 108 (see FIG. 8) which is rotatably mounted in the carrier 104 of the carrier/guide-assembly 100 so as to be adjustable in various rotational positions. Such a rotatable table 108 may be beneficial in correctly positioning the mold half 30.

In an embodiment, the spill ring engagement device 204 may comprise at least one pair of pinching members 206. See in this respect especially the example shown in FIG. 11. In this example, two pairs of pinching members 206 are visible. Each pinching member 206 has a sharp protruding end and may be moveable along a first direction towards and away from spill ring removal position P1. The two pinching members 206 of each pair of pinching members 206 may additionally be moveable along a second direction towards and away from each other. The movement of each pinching member 206 along the first direction may be combinable with the movement along the second direction so that during engagement of the spill ring material 18, the spill ring material 18 is pinched or pulled and separated from the lens body 14, the lens support members 16 and the mold half 30.

As shown in the example of the figures, the pinching member 206 are positioned under the spill ring removal position P1. Any debris which may be produced during the pinching is more likely to fall down than to end up on the lens body 14 which would make the intraocular lens 12 not fit for use.

In an embodiment, the spill ring removal station 200 may include a scraper (not shown) for scraping the spill ring material 18 from the pinching member 206. Instead of or in addition to a scraper, a blower may be used to remove the spill ring material 18 and any debris which may be generated during the spill ring material removal.

In an embodiment, the bond breaking station 300 may comprise a plurality of tapping needles 302 each having a first end 302a and an opposite second end 302b (see FIGS. 7, 8, 13 and 15). The first ends 302a of the tapping needles 302 are connected to a tapping needle actuator 304. The bond breaking station 300 also comprises a guiding plate 306 (see additionally to the previously mentioned figures also FIG. 16) with a plurality of guiding holes 308. Each guiding hole 308 may guide a tapping needle 302. The second ends 302b of the tapping needles 302 are configured and arranged tap on an area of the bottom side 30a of the mold half 30 when being actuated.

Thus, at a very well-defined area of the bottom side a mechanical oscillating load can be exerted by means of the tapping needles 302. Thus, an effective manner of breaking the bonds between the lens body 40 and the mold half 30 may be obtained. Due to the precise location at which the mold half may be subjected to the mechanical oscillating load, the amplitude of the oscillating load may be relatively small which reduces the chance of damage of the intraocular lens 12 in particular of the optical characteristics of the lens body 14.

In an embodiment, the holes 308 in the guiding plate 306 may be positioned such that an area of the bottom side 30a of the mold half 30 on which at least a first number of the plurality the tapping needles 302 tap is directly opposite the lens body 14.

Thus, predominantly the bonds between the lens body 14 and the mold half 30 are broken.

In an embodiment, the guiding plate 306 may additionally include holes 306 through which a second number of the plurality of tapping needles 302 extend and which are positioned such that the second number of the plurality of tapping needles 302 taps on second areas of the bottom side 30a of the mold half 30 which are directly opposite the lens supporting members 16.

In this embodiment, not only the bonds between the lens body 14 and the mold half 30 are broken but also bonds between the lens support members 16 and the mold half 30 are broken. This may be beneficial in the subsequent static push force exertion on the lens support members 16 to release the lens support members 16 from the mold half 30.

In an embodiment, tapping needle actuator 304 may be a pneumatic actuator of a type known as pneumatic needle hammer.

It should be noted, that instead of a carrier/guide-assembly 100 other means of transferring the mold half 30 with the intraocular lens assembly 20 or intraocular lens 12 contained therein are feasible. For example, a robot handler could be used as well. An example of a robot handler is shown in FIGS. 2 and 3. This is a robot handler of the SCARA-type. However, other robot handlers are feasible as well.

Figure 22:
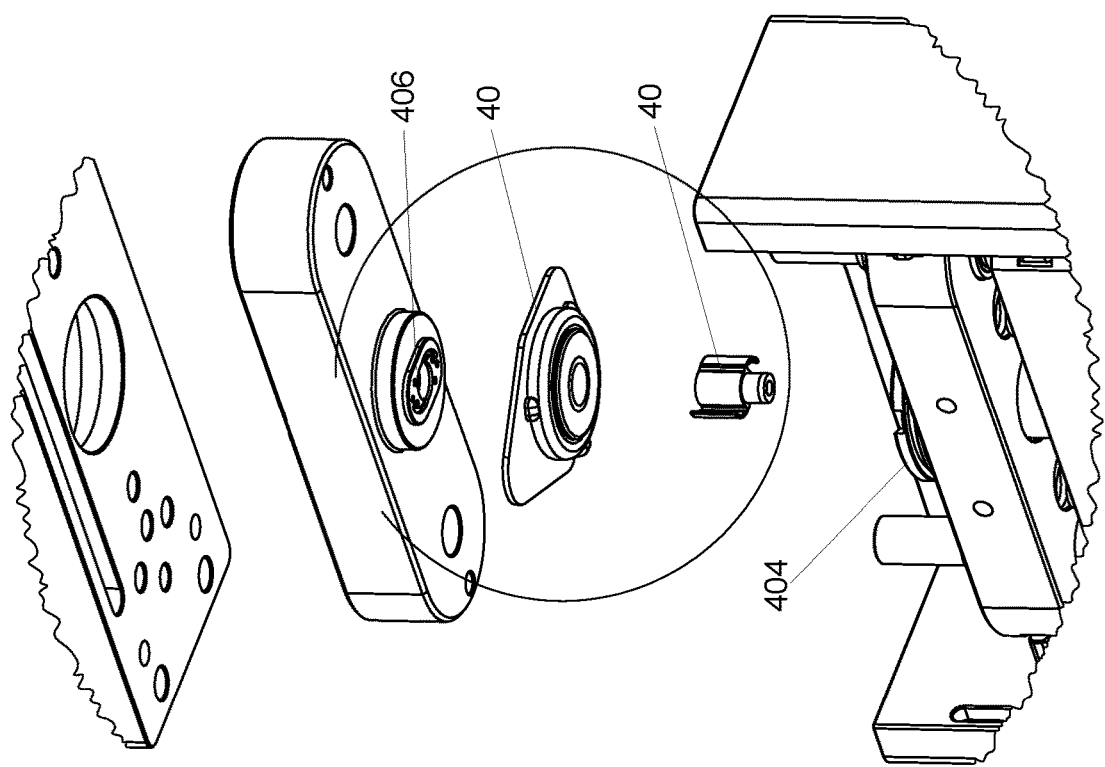
FIG. 22 shows an exploded view of FIG. 18 from another view point.

In an embodiment, the push station 400 (see FIGS. 17-23) may additionally comprise a mold/lens-assembly carrier 404 in which a mold/lens-assembly 40 is placeable. The carrier 404 is clearly visible in FIG. 20. The push station 400 may also comprise a nest 406 (see FIGS. 22, 23) which is configured to exert a counter force on a top side of the mold half 30b so as to keep the mold half in a stable position in the mold/lens-assembly carrier 404 when the die 402 exerts a static mechanical push force on the bottom side 30a of the mold half 30.

In an embodiment, the push station 400 may comprise a push station slide 408 (see FIG. 17) which is laterally movable relative to the die 402 and the nest 406. The push station slide 408 carries the mold/lens-assembly carrier 404 and is moveable from a first position to a second position. In the first position, the mold/lens-assembly carrier 404 is accessible for the handler assembly 100, 140 for placement of the mold/lens-assembly 40 therein or removal of the mold/lens-assembly 40 therefrom. In the second position, the mold/lens-assembly carrier 404 is positioned between the die 402 and the nest 406.

The push station slide 408 makes placement of the mold/lens-assembly 40 in the push station between the die 402 and the nest 406 easier than when the mold/lens-assembly carrier 404 were stationary positioned between the die 402 and the nest 406.

In an embodiment, the handler assembly 100, 140 may comprise a handler robot 140 (see FIGS. 2 and 3) which is configured to transfer the mold/lens-assembly 40 from mold half receiving recess 106 being in the unloading position P3 to the push station 400 and place the mold/lens-assembly 40 in the mold/lens-assembly carrier 404 of the push station 400.

In the example shown in the figures, the handler robot 140 is embodied as a SCARA-robot which are, for example, delivered by Epson®. However, other types of handlers are also feasible for transporting the mold/lens-assembly 40.

In an embodiment, the die 402 (see FIGS. 20-25) may have a die end face 410 with a die profile structure which comprises lens support member pushing areas 412 which protrude from the die end face 410 and which have a form and position that substantially correspond with a form and position of the lens support members 16 so that during the exerting of the static mechanical push force the lens support members 16 are at least partly, or alternatively entirely separated from the mold half 30 during the exerting of the static mechanical push force.

When the lens support members 16 are only partly separated from the mold half 30, this may for example be such that the lens support members 16 are completely separated mold half 30 apart from at the connection of the lens support members 16 with the lens body 14. This may be beneficial when other process steps are desired whereby it is beneficial to be able to handle the mold/lens-assembly 40 as a whole. An intermediate process step may be a coating step. Coating may be desirable to prevent sticking of the lens support members 16 on the lens body 14. By applying a coating after the lens support members 16 have been pushed loose from the mold half 30, the coating may cover all sides, i.e. top, bottom and lateral sides, of the lens support member 16. When covered with a coating, sticking of the lens support members 16 on the lens body 14 during subsequent handling of the intraocular lens 12 may be prevented. Due to the fact that the lens support members 16 may still be partly connected to the mold half, inadvertent displacement of the intraocular lenses 12 relative to the mold halves 30 may be prevented and the handling of the mold/lens-assembly 40 may be quickly without the risk of losing the intraocular lenses 12 from the mold halves 30.

When the lens support members 16 are entirely separated from the mold half 30, the intraocular lens 12 may be readily picked up and removed from the mold half 30 by a person or a handler.

In most general terms, the disclosure also provides a method for removing an intraocular lens 12 from an injection molded mold half 30. With the method, first a mold half 30 is provided having a bottom side 30a and an opposite top side 30b in which an intraocular lens assembly 20 is contained and attached by bonds between material from which mold half 30 is formed and a cured monomer lens material from which the intraocular lens assembly 20 is formed. The intraocular lens assembly 20 comprises the intraocular lens 12 with the lens body 14 and the lens support members 16 as well as the spill ring material 18. For separating the intraocular lens 12 from the mold half 30 in accordance with the method, the mold half 30 is held and the spill ring material 18 is mechanically engaged to remove the spill ring material 18 from the mold half 30 to provide a mold/lens-assembly 40 consisting of the mold half 30 and the intraocular lens 12, i.e. without the spill ring material 18.

Subsequently, in accordance with the method, the mold/lens-assembly 40 is subjected to an oscillating mechanical load without substantial deformation of the at least a part of the mold half 30 that is in direct contact with the lens body 14. The oscillating mechanical load has an oscillation frequency which is in a range that excites the mold/lens-assembly 40 to break the bonds between the intraocular lens 12 and the mold half 30.

Subsequently, a static mechanical push force is exerted on the bottom side 30a of the mold half 30 to at least partly separate the intraocular lens 12 from the mold half 30.

The advantages of this method have been described in the summary and are considered to be incorporated herein by reference.

In an embodiment, an amplitude of the oscillating mechanical load and the strength of the static mechanical push force are so small that of the removed intraocular lens 12 the modulation transfer function (MTF) is higher than 0.80, preferably higher than 0.85 times the MTF measured in an identical way from a lathed intraocular lens having the same model as the intraocular lens 12. The MTF is defined in ISO11979-2. In a Cornea Eye model the MTF of the intraocular lens 12 measured at 50 c/mm at a diameter of 3 mm may be at least 0.54.

It has been established, that the amplitude of the oscillating mechanical load and the strength of the static mechanical push force have an influence on the optical quality of the intraocular lens 12 which is obtained after the separation from the mold half 30. Especially the amplitude of the mechanical load is of importance in this respect and, once knowing that the amplitude is an important parameter, the skilled person will be able by varying the amplitude to achieve a modulation transfer function as defined above.

In an embodiment, the oscillation frequency is substantially equal to a resonance frequency of the mold/lens-assembly 40.

It appears that subjecting the mold/lens-assembly 40 to a mechanical load with an oscillation frequency which is substantially equal to the resonance frequency of the mold/lens-assembly 40 provides a quick and effective means to break the bonds between the intraocular lens 12 and the mold half 30. In an alternative embodiment, the oscillation frequency may also be a higher harmonic of the resonance frequency of the mold/lens-assembly 40.

In an embodiment, the subjecting the mold/lens-assembly 40 to an oscillating mechanical load comprises tapping on the bottom side 30a of mold half 30.

Thus, a specific area of the bottom side 30a may be subjected to the tapping. Thus, the amount of energy which is transferred to the mold/lens-assembly 40 may be minimal while the effect of breaking the bonds may be optimal.

In an embodiment, the tapping on the bottom side 30a of the mold half 30 may be effected with a plurality of tapping needles 302.

With tapping needles 302, a very local area of the bottom side 30a of the mold half 30 may be subjected to the oscillating mechanical load.

In an embodiment, the tapping needles 302 may tap on an area of the bottom side 30 which is directly opposite the lens body 14. Thus, especially the bonds between the lens body 14 and the mold cup 30 will be broken.

Although it is not excluded that the bonds between the lens support members 16 and the mold half 30 may additionally be subjected to localized tapping with tapping needles 302, the final separation of the lens support members 16 will be effected by the subsequent static mechanical push force on the bottom side 30a of the mold half 30.

In an embodiment, the oscillation frequency may in the range of 1 to 5 kHz. For mold/lens-assemblies 40 shown in FIG. 1, be it that the spill ring material 18 is removed, this frequency range provides good bond breaking results.

Figure 24:
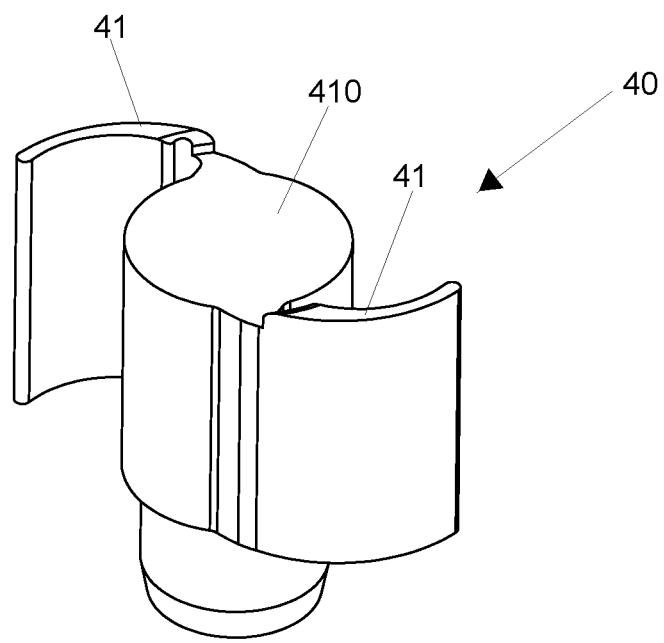
FIG. 24 shows a perspective view of an example of a die.
Figure 25:
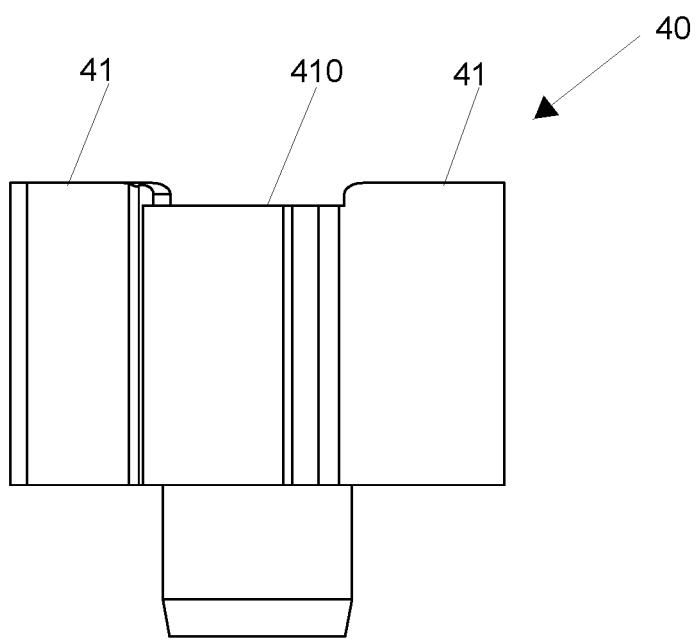
FIG. 25 shows a side view of the die of FIG. 24.

It should be noted that the oscillating mechanical load may also be effected in manners other than with tapping needles 302 as described above. Instead, the mold/lens-assembly 40 as a whole may be subjected to an oscillating movement. In yet another embodiment, the mold half 30 may have a flexible, integrally formed handle flap. The handle flap may be clamped in a clamp and the remaining, free hanging part of the mold half 30 may be subjected to an oscillating mechanical load. For example, cogs of a rotating cogwheel may tap against the free hanging part of the mold half 30 so as to flipper the free hanging part of the mold half 30 while the handle flap is clamped in the clamp and kept stationary. In an embodiment, the exerting of the static mechanical push force on the bottom side 30a of the mold half 30 may comprises pushing a die 402 against the bottom side 30a of the mold half 30. An example of the die 402 is shown in FIGS. 24 and 25. The die may have a die end face 410 with a die profile structure which comprises lens support member pushing areas 412 which protrude from the die end face 410 and which have a form and position that substantially correspond with a form and position of the lens support members 16. As a consequence, during the exerting of the static mechanical push force on the bottom side 30a of the mold half 30, the lens support members 16 are at least partly or, alternatively entirely separated from the mold half 30 during the exerting of the static mechanical push force.

In an embodiment, the step of providing the mold half 30 having a bottom side 30a and an opposite top side 30b in which an intraocular lens assembly 20 is contained and attached by bonds may comprise:
  injection molding the mold half 30;
  injection molding a second mold half 32;
  introducing monomer material in the top side 30b of the mold half 30;
  place the second mold half 32 on the top side 30b of the mold half 30;
  cure the monomer thereby forming an intraocular lens assembly 20 including the lens body 14, the lens support members 16 and spill ring material 18 and forming bonds between the intraocular lens assembly 20 and the mold half 30; and remove the second mold 32 half from the mold half 30.

Thus, a fully automated method of producing mold halves 30, 32 and intraocular lenses 12, as well as separating the intraocular lenses 12 from the mold half 30 is obtained.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this description are not necessarily all referring to the same embodiment.

Furthermore, it is noted that particular features, structures, or characteristics of one or more of the various embodiments which are described above may be used implemented independently from one another and may be combined in any suitable manner to form new, not explicitly described embodiments. The reference numbers used in the detailed description and the claims do not limit the description of the embodiments, nor do they limit the claims. The reference numbers are solely used to clarify.

LIST OF ELEMENTS

10. Assembly for removing an intraocular lens
11. Electronic controller assembly
12. Intraocular lens
14. Lens body
16. Lens support members
18. Spill ring material
20. Intraocular lens assembly
30. Mold half
30a. Bottom side of mold half
30b. Top side of mold half
32. Second mold half
40. Mold/lens-assembly
100. Carrier/guide-assembly of handler assembly
102. Linear guide
104. Carrier
106. Mold half receiving recess
108. Rotatable table
140. Robot of handler assembly
200. Spill ring removal station
202. Mold half holding device
204. Spill ring engagement device
206. Pinching members
300. Bond breaking station
302. Tapping needles
302a. First end of tapping needle
302b. Second end of tapping needle
304. Tapping needle actuator
306. Guiding plate
308. Guiding hole
400. Push station
402. Die
404. Mold/lens-assembly carrier
406. Nest
408. Push station slide
410. Die end face
412. Lens support member pushing areas
P1. Spill ring removal position
P2. Bond breaking position
P3. Unloading position

The invention claimed is:

1. Method for removing an intraocular lens (12) from an injection molded mold half (30), the intraocular lens (12) having a lens body (14) and lens support members (16) connected to the lens body (14), the method comprising:

providing a mold half (30) having a bottom side (30a) and an opposite top side (30b) in which an intraocular lens assembly (20) is contained and attached by bonds between material from which mold half (30) is formed and a cured monomer lens material from which the intraocular lens assembly (20) is formed, the intraocular lens assembly (20) comprising the intraocular lens (12) with the lens body (14) and the lens support members (16) as well as spill ring material (18);

wherein for separating the intraocular lens (12) from the mold half (30) the method subsequently comprises:

holding the mold half (30) and mechanically engaging the spill ring material (18) to remove the spill ring material (18) from the mold half (30) to provide a mold/lens-assembly (40) consisting of the mold half (30) and the intraocular lens (12);

subjecting the mold/lens-assembly (40) to an oscillating mechanical load without substantial deformation of at least a part of the mold half (30) that is in direct contact with the lens body (14), the oscillating mechanical load having an oscillation frequency which is in a range that excites the mold/lens-assembly (40) to break the bonds between the intraocular lens (12) and the mold half (30); and exerting a static mechanical push force on the bottom side (30a) of the mold half (30) to at least partly separate the intraocular lens (12) from the mold half (30).

2. The method according to claim 1, wherein an amplitude of the oscillating mechanical load and the strength of the static mechanical push force are so small that of the removed intraocular lens (12) the modulation transfer function (MTF) is higher than 0.80, preferably higher than 0.85 times the MTF measured in an identical way from a lathed intraocular lens having the same model as the intraocular lens (12).

3. The method according to claim 1, wherein the oscillation frequency is substantially equal to a resonance frequency of the mold/lens-assembly (40) or a higher harmonic of the resonance frequency of the mold/lens assembly (40).

4. The method according to claim 1, wherein the oscillation frequency is in the range of 1 to 5 kHz.

5. The method according to claim 1, wherein the exerting of the static mechanical push force on the bottom side (30a) of the mold half (30) comprises pushing a die (402) against the bottom side (30a) of the mold half (30), the die having a die end face (410) with a die profile structure which comprises lens support member pushing areas (412) which protrude from the die end face (410) and which have a form and position that substantially correspond with a form and position of the lens support members (16) so that during the exerting of the static mechanical push force the lens support members (16) are at least partly separated from the mold half (30) during the exerting of the static mechanical push force.

6. The method according to claim 1, wherein the subjecting the mold/lens-assembly (40) to an oscillating mechanical load comprises tapping on the bottom side (30a) of the mold half (30).

7. The method according to claim 6, wherein the tapping on the bottom side (30a) of the mold half (30) is effected with a plurality of tapping needles (302).

8. An assembly for removing an intraocular lens (12) from an injection molded mold half (30), the intraocular lens (12) having a lens body (14) and lens support members (16) connected to the lens body (14), the assembly (10) comprising:
- a handler assembly (100, 140) configured to handle a mold half (30) having a bottom side (30a) and an opposite top side (30b) in which an intraocular lens assembly (20) is contained and attached by bonds between material from which mold half (30) is formed and a cured monomer lens material from which the intraocular lens assembly (20) is formed, the intraocular lens assembly (20) comprising the intraocular lens (12) with the lens body (14) and the lens support members (16) as well as spill ring material (18);
- a spill ring removal station (200) including a spill ring engagement device (204) that is configured for mechanically engaging the spill ring material (18), to remove the spill ring material (18) from the mold half (30) to provide a mold/lens-assembly (40) consisting of the mold half (30) and the intraocular lens (12);
- a bond breaking station (300) configured to subject the mold/lens-assembly (40) to an oscillating mechanical load without substantial deformation of at least a part of the mold half (30) that is in direct contact with the lens body (14), the oscillating mechanical load having an oscillation frequency which is in a range that excites the mold/lens-assembly (40) to break the bonds between the intraocular lens (12) and the mold half (30);
- a push station (400) including a die (402) which is configured to exert a static mechanical push force on the bottom side (30a) of the mold half (30) to at least partly separate the intraocular lens (12) from the mold half (30); and
- an electronic controller assembly (11) which is configured to control the operation of the handler assembly (100, 140) such that
  - each mold half (30) with an intraocular lens assembly (20) contained therein is first transported by the handler assembly (100, 140) to a spill ring removal position (P1) in the spill ring removal station (200);
  - that subsequently, after removal of the spill ring material (18) the handler assembly (100, 140) transports the mold/lens assembly (40) from the spill ring removal station (200) to a bond breaking position (P2) in the bond breaking station (300); and
  - that subsequently, after breaking the bonds in the bond breaking station (300) the handler assembly (100, 140) transports the mold/lens-assembly (40) to the push station (400);
- wherein the electronic controller assembly (11) is also configured to:
  - control the spill ring engagement device (204) of the spill ring removal station (200);
  - control the bond breaking station (300) to subject the mold/lens-assembly (40) to the oscillating mechanical load; and to
  - control the push station (400) by operating the die (402) to at least partly separate the intraocular lens (12) from the mold half (30) by exerting a static mechanical push force on the bottom side (30a) of the mold half (30).

9. The assembly according to claim 8, wherein the spill ring engagement device (204) comprises:
- at least one pair of pinching members (206), wherein each pinching member (206) has a sharp protruding end and is moveable along a first direction towards and away from spill ring removal position (P1), wherein the two pinching members (206) of each pair of pinching members (206) are moveable along a second direction towards and away from each other, wherein the movement of each pinching member (206) along the first direction is combinable with the movement along the second direction so that during engagement of the spill ring material (18), the spill ring material (18) is pinched and separated from the lens body (14), the lens support members (16) and the mold half (30).

10. The assembly according to claim 8, wherein the die (402) of the push station (200) has a die end face (410) with a die profile structure which comprises lens support member pushing areas (412) which protrude from the die end face (410) and which have a form and position that substantially correspond with a form and position of the lens support members (16) so that during the exerting of the static mechanical push force the lens support members (16) are at least partly separated from the mold half (30) during the exerting of the static mechanical push force.

11. The assembly of claim 8, wherein the handler assembly (100, 140) comprises:
- a carrier/guide-assembly (100) comprising a linear guide (102) and a carrier (104) which is movable over the linear guide (102), wherein the carrier (104) has a mold half receiving recess (106) in which the mold half (30) is placeable;
- wherein the carrier/guide-assembly (100) is configured to be positioned in at least three positions including:
  - a loading/unloading position (P3) in which the mold half receiving recess (106) is accessible for loading/unloading a mold half (30) with an intraocular lens assembly (20) contained therein;
  - the spill ring removal position (P1) in which the mold half receiving recess (106) is positioned in the spill ring removal station (200); and
  - the bond breaking position (P2) in which the mold half receiving recess (106) is positioned in the bond breaking station (300).

12. The lens assembly according to claim 11, wherein the mold half receiving recess (106) is formed in a rotatable table (108) which is rotatably mounted in the carrier (104) of the carrier/guide-assembly (100) so as to be adjustable in various rotational positions.

13. The assembly according to claim 8, wherein the bond breaking station (300) comprises:
- a plurality of tapping needles (302) each having a first end (302a) and an opposite second end (302b);
- a tapping needle actuator (304), wherein the first ends (302a) of the tapping needles (302) are connected to the tapping needle actuator (304);
- a guiding plate (306) with a plurality of guiding holes (308), wherein each guiding hole (308) guides a tapping needle (302);
  - wherein the second ends (302b) of the tapping needles (302) are configured and arranged to tap on an area of the bottom side (30a) of the mold half (30) when being actuated.

14. The lens assembly according to claim 13, wherein the holes (308) in the guiding plate (306) are positioned such that an area of the bottom side (30a) of the mold half (30)

on which at least a first number of the plurality the tapping needles (302) tap is directly opposite the lens body (14).

15. The lens assembly according to claim 14, wherein the guiding plate (306) additionally includes holes (306) through which a second number of the plurality of tapping needles (302) extend and which are positioned such that the second number of the plurality of tapping needles (302) taps on second areas of the bottom side (30*a*) of the mold half (30) which are directly opposite the lens supporting members (16).

16. The assembly according to claim 8, wherein the push station (400) additionally comprises:
- a mold/lens-assembly carrier (404) in which a mold/lens-assembly is placeable;
- a nest (406) which is configured to exert a counter force on a top side of the mold half (30*b*) so as to keep the mold half in a stable position in the mold/lens-assembly carrier (404) when the die (402) exerts a static mechanical push force on the bottom side (30*a*) of the mold half (30).

17. The assembly according to claim 16, wherein the push station (400) comprises:
- a push station slide (408) which is laterally movable relative to the die (402) and the nest (406) and which carries the mold/lens-assembly carrier (404), wherein the push station slide (408) is moveable from a first position to a second position, wherein, in the first position the mold/lens-assembly carrier (404) is accessible for the handler assembly (100, 140) for placement of the mold/lens-assembly (40) therein or removal of the mold/lens-assembly (40) therefrom, and wherein in the second position, the mold/lens-assembly carrier (404) is positioned between the die (402) and the nest (406).

18. The assembly according to claim 16, wherein the handler assembly comprises:
- a handler robot (140) which is configured to transfer the mold/lens-assembly (40) from mold half receiving recess (106) being in the unloading position (P3) to the push station (400) and place the mold/lens-assembly (40) in the mold/lens-assembly carrier (404) of the push station (400).

* * * * *